United States Patent
Straitiff et al.

(10) Patent No.: US 11,801,717 B2
(45) Date of Patent: *Oct. 31, 2023

(54) SYSTEM AND METHOD FOR STEMMING A WHEEL

(71) Applicant: Android Industries, LLC, Auburn Hills, MI (US)

(72) Inventors: Donald Graham Straitiff, Howell, MI (US); Christopher Michael Bulliner, Goodrich, MI (US); Steven Edward Lind, Waterloo, IN (US)

(73) Assignee: Android Industries LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,115

(22) Filed: Sep. 10, 2022

(65) Prior Publication Data

US 2023/0001754 A1 Jan. 5, 2023

Related U.S. Application Data

(63) Continuation of application No. 16/261,288, filed on Jan. 29, 2019, now Pat. No. 11,472,240.
(Continued)

(51) Int. Cl.
*B60C 25/18* (2006.01)
*B23P 19/04* (2006.01)
(Continued)

(52) U.S. Cl.
CPC ............ *B60C 25/185* (2013.01); *B23P 19/04* (2013.01); *B25J 9/1674* (2013.01);
(Continued)

(58) Field of Classification Search
CPC .... B60C 25/185; B60C 23/0494; G01D 21/00
See application file for complete search history.

(56) References Cited

U.S. PATENT DOCUMENTS 4,353,156 A 10/1982 Rosaz
5,940,960 A 8/1999 Doan et al.
(Continued)

FOREIGN PATENT DOCUMENTS

CN 205273061 U * 6/2016 ......... B60C 23/0494
JP 2004066848 A * 3/2004 ......... B60C 23/0408
(Continued)

OTHER PUBLICATIONS

Written Opinion of the International Searching Authority for International Application No. PCT/US2019/015745 dated May 22, 2019.

*Primary Examiner* — Mischita L Henson
(74) *Attorney, Agent, or Firm* — Miller Johnson

(57) ABSTRACT

A stemming system includes a computing device and a stemming device. The computing device includes data processing hardware and memory hardware in communication with the data processing hardware. The data processing hardware includes a transmitter and a receiver. The stemming device is communicatively-coupled to the computing device. The stemming device includes a base portion and a valve-engaging portion. The valve-engaging portion includes a transducer that obtains a measurement communicated to the receiver of the computing device. The measurement includes at least one physical parameter associated with installing a tire-wheel assembly valve to a wheel throughout a process of disposing the valve within a valve hole of the wheel. The processor analyzes a data signature associated with the measurement for determining if the valve has been adequately or inadequately installed by the stemming device.

20 Claims, 19 Drawing Sheets

Related U.S. Application Data

(60) Provisional application No. 62/624,004, filed on Jan. 30, 2018.

(51) Int. Cl.
  *B25J 9/16* (2006.01)
  *B25J 15/00* (2006.01)
  *G01D 21/00* (2006.01)
  *B60C 23/04* (2006.01)

(52) U.S. Cl.
  CPC .......... *B25J 15/0019* (2013.01); *G01D 21/00* (2013.01); *B23P 2700/50* (2013.01); *B60C 23/0494* (2013.01); *G05B 2219/31027* (2013.01)

(56) References Cited

U.S. PATENT DOCUMENTS

| | | | |
|---|---|---|---|
| 7,509,849 B2 * | 3/2009 | Rutherford | B60C 23/0406 340/447 |
| 7,578,052 B2 | 8/2009 | Mondrusov et al. | |
| 7,836,569 B2 * | 11/2010 | Spaulding | B25B 27/00 29/244 |
| 2002/0104374 A1 | 8/2002 | Merendino et al. | |
| 2004/0187282 A1 | 9/2004 | Pellerin et al. | |
| 2007/0107183 A1 | 5/2007 | Lawson et al. | |
| 2010/0013913 A1 | 1/2010 | Vignoli | |
| 2013/0282231 A1 * | 10/2013 | Farr | G01B 11/2755 701/1 |

FOREIGN PATENT DOCUMENTS

| | | | | | |
|---|---|---|---|---|---|
| JP | 2007015534 A | * | 1/2007 | ......... | B60C 23/0408 |
| TW | 528689 B | * | 5/2002 | ........... | B60C 23/0494 |
| WO | 2013152294 A1 | | 10/2013 | | |

* cited by examiner

SYSTEM AND METHOD FOR STEMMING A WHEEL

CROSS REFERENCE TO RELATED APPLICATION

This application is a continuation of U.S. application Ser. No. 16/261,288, filed on Jan. 29, 2019, which claims priority under 35 U.S.C. § 119(e) to U.S. Provisional Application 62/624,004, filed on Jan. 30, 2018 the disclosures of which are considered part of the disclosure of this application and are hereby incorporated by reference in their entirety.

FIELD OF THE INVENTION

The disclosure relates to a stemming device, a stemming system including a stemming device and a wheel processing system including the same.

DESCRIPTION OF THE RELATED ART

It is known in the art to assemble a tire-wheel assembly in several steps. Usually, conventional methodologies that conduct such steps require a significant capital investment and human oversight. The present invention overcomes drawbacks associated with the prior art by setting forth a simple system and method that contributes to assembling a tire-wheel assembly.

BRIEF DESCRIPTION OF THE DRAWINGS

The disclosure will now be described, by way of example, with reference to the accompanying drawings, in which.

SUMMARY

Figure 1:
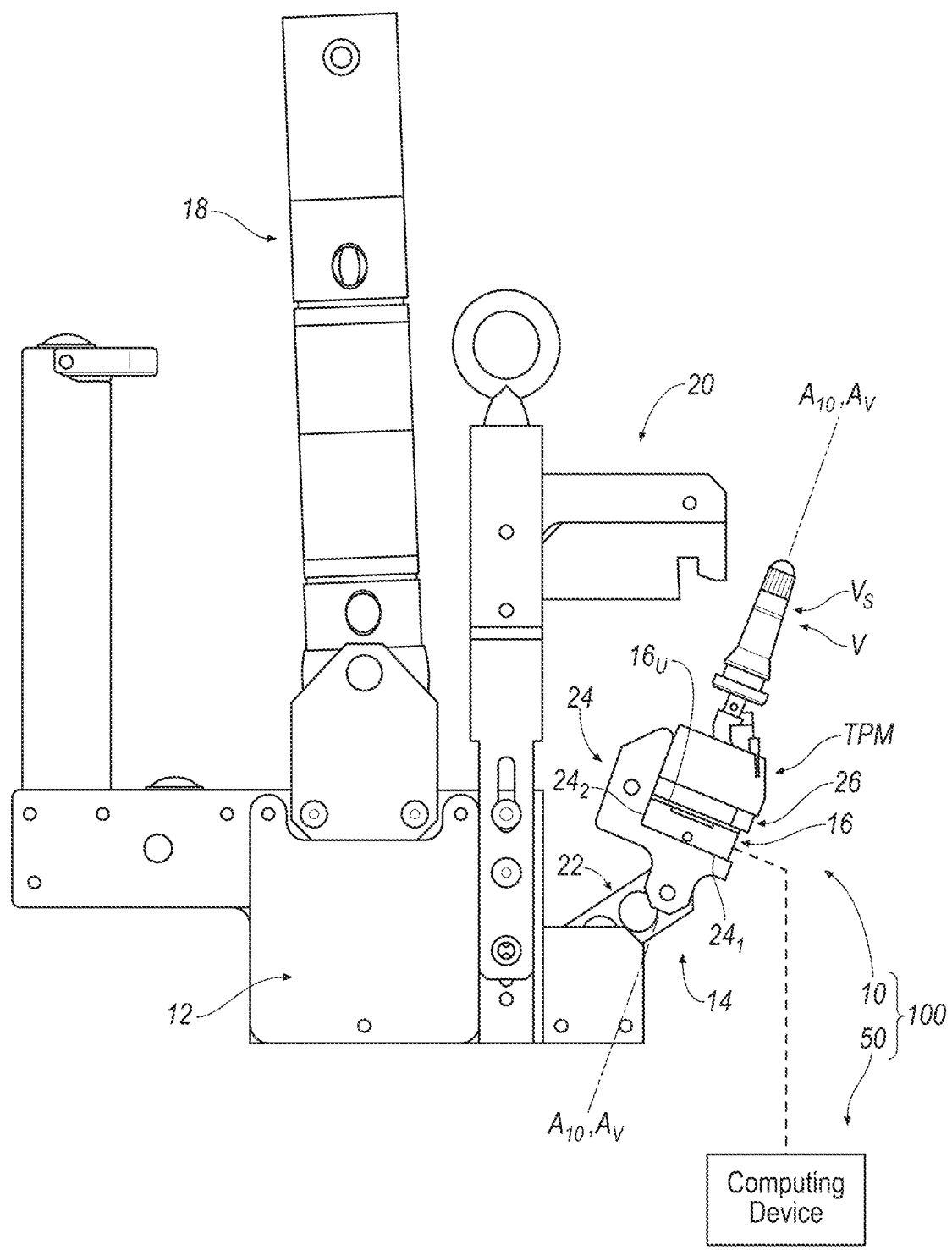
FIG. 1 is a side view of a valve including a tire pressure monitor removably-secured to an exemplary stemming device that is communicatively-coupled to a computing device.

One aspect of the disclosure provides a system including data processing hardware and memory hardware in communication with the data processing hardware storing instructions that when executed on the data processing hardware cause the data processing hardware to perform operations. The operations include receiving, at a receiver of the data processing hardware, data associated with at least one physical parameter associated with installing a tire-wheel assembly valve along an installation axis of a stemming device including a transducer that communicated with a tire-wheel assembly valve. The operations further include recording, in the memory hardware, the received data throughout an act of the stemming device inserting the tire-wheel assembly valve through a valve hole of a wheel. The operations yet further include utilizing an algorithm at a processor of the data processing hardware for comparing the recorded data against a data signature for determining if the tire-wheel assembly valve is adequately or inadequately installed within the valve hole of the wheel.

Implementations of the disclosure may include one or more of the following optional features. For example, the operations further include sending, from a transmitter of the data processing hardware, a validation signal to a wheel processing system including the stemming device for validating the wheel including the tire-wheel assembly valve being adequately disposed within the valve hole of the wheel.

In some implementations, the operations further include sending, from a transmitter of the data processing hardware, a rejection signal to a wheel processing system including the stemming device for rejecting the wheel including the tire-wheel assembly valve being inadequately disposed within the valve hole of the wheel.

In some examples, the data associated with the transducer is derived from at least one of a force transducer, pressure transducer, absolute position transducer, relative position transducer, proximity transducer or the like, and is positioned axially along an installation axis the stemming device received by the receiver of the data processing hardware at a rate of 100 Hz or greater.

In some implementations, the data signature is formulated by numerically estimating a time derivative of the axial force along the installation axis of the stemming device over time.

In some examples, the processor of the data processing hardware retrieves the data signature from a characteristic signature database stored in the memory hardware. The characteristic signature database includes one or more data signatures indicative of an adequate installation of one or more types of tire-wheel assembly valves within valve holes of one or more types of wheels.

Another aspect of the disclosure provides computer program product encoded on a non-transitory computer readable storage medium comprising instructions that when executed by a data processing apparatus cause the data processing apparatus to perform operations. The operations include receiving, at a receiver of the data processing apparatus, data associated with an applied axial force along an installation axis of a stemming device including a force transducer that supports a tire-wheel assembly valve. The operations also include recording, in memory hardware of the data processing apparatus, the received data throughout an act of the stemming device inserting the tire-wheel assembly valve through a valve hole of a wheel. The operations further include utilizing an algorithm at a processor of the data processing apparatus for comparing the recorded data against a data signature for determining if the tire-wheel assembly valve is adequately or inadequately installed within the valve hole of the wheel.

Implementations of the disclosure may include one or more of the following optional features. For example, the operations include sending, from a transmitter of the data processing apparatus, a validation signal to a wheel processing system including the stemming device for validating the wheel including the tire-wheel assembly valve being adequately disposed within the valve hole of the wheel.

In some implementations, the operations include sending, from a transmitter of the data processing apparatus, a rejection signal to a wheel processing system including the stemming device for rejecting the wheel including the tire-wheel assembly valve being inadequately disposed within the valve hole of the wheel.

Yet another aspect of the disclosure provides a stemming system. The stemming system includes a computing device, a stemming device and an algorithm. The computing device includes data processing hardware and memory hardware in communication with the data processing hardware. The data processing hardware includes a transmitter and a receiver. The stemming device is communicatively-coupled to the computing device. The stemming device includes a base portion and a valve-engaging portion. The valve-engaging portion includes a force transducer that obtains a measurement communicated to the receiver of the computing device. The measurement is an applied axial force over time imparted by the valve-engaging portion to a wheel by way of a valve throughout a process of disposing the valve within a valve hole of the wheel. The algorithm is executed by a processor of the data processing hardware for analyzing a data signature associated with the measurement for determining if the valve has been adequately or inadequately installed by the stemming device.

Implementations of the disclosure may include one or more of the following optional features. For example, the stemming system may further include a wheel-engaging portion connected to the base portion. The wheel-engaging portion includes a wheel clamping portion for securing the stemming device to the wheel.

In some implementations, the valve-engaging portion may further include a support portion that supports the force transducer. The support portion is generally defined by a first surface and a second surface. The first surface directly supports the force transducer and is substantially orthogonal to an installation axis of the stemming device. The installation axis of the stemming device is axially aligned with an axis extending through an axial center of the valve. The force transducer is uniaxial or co-linear with the axis extending through the axial center of the valve.

In some examples, the valve-engaging portion further includes an arm portion rotatably-connected to the base portion. The valve-engaging portion may yet further include a valve securing portion disposed upon the force transducer. The second surface of the support portion is substantially perpendicular to the first surface of the support portion and is configured to support or is arranged at least proximate a side surface of one or more of the force transducer, the securing portion and a tire pressure monitor connected to the valve. The second surface is substantially parallel to the installation axis of the stemming device.

In some implementations, the stemming system may further include a carrier portion connected to the base portion. The carrier portion may be an end effector of a robotic device having a robotic arm.

In some examples, the robotic device is a component of a wheel processing system including a wheel conveyor that moves a plurality of wheels past the robotic device such that the robotic device may dispose the valve within the valve hole of the wheel. The wheel processing system further includes a conveyor controller connected to a conveyor switch that is operable for advancing at least one inadequately stemmed wheel from a first direction along the wheel conveyor to a second direction along a rejection conveyor to a reject station.

In some instances, the valve-engaging portion further includes a plurality of linear servos. The plurality of linear servos may be connected to the base portion.

In some implementations, the plurality of linear servos are components of a wheel processing system including a wheel conveyor that moves a plurality of wheels past the plurality of linear servos such that the plurality of linear servos may dispose the valve within the valve hole of the wheel. The wheel processing system further includes a conveyor controller connected to a conveyor switch that is operable for advancing at least one inadequately stemmed wheel from a first direction along the wheel conveyor to a second direction along a rejection conveyor to a reject station.

Another aspect of the disclosure provides a stemming system. The stemming system includes a computing device, a stemming device and means for analyzing a data signature. The computing device includes data processing hardware and memory hardware in communication with the data processing hardware. The data processing hardware includes a transmitter and a receiver. The stemming device is communicatively-coupled to the computing device. The stemming device includes a base portion and a valve-engaging portion. The valve-engaging portion includes a force transducer that obtains a measurement communicated to the receiver of the computing device. The measurement is an applied axial force over time imparted by the valve-engaging portion to a wheel by way of a valve throughout a process of disposing the valve within a valve hole of the wheel. The means for analyzing a data signature is executed by a processor of the data processing hardware. The means for analyzing a data signature analyzes the data signature associated with the measurement for determining if the valve has been adequately or inadequately installed by the stemming device.

Implementations of the disclosure may include one or more of the following optional features. For example, the stemming system may further include a wheel-engaging portion connected to the base portion. The wheel-engaging portion includes a wheel clamping portion for securing the stemming device to the wheel.

In some implementations, the valve-engaging portion may further include a support portion that supports the force transducer. The support portion is generally defined by a first surface and a second surface. The first surface directly supports the force transducer and is substantially orthogonal to an installation axis of the stemming device. The installation axis of the stemming device is axially aligned with an axis extending through an axial center of the valve. The force transducer is uniaxial or co-linear with the axis extending through the axial center of the valve.

In some examples, the valve-engaging portion further includes an arm portion rotatably-connected to the base portion. The valve-engaging portion may yet further include a valve securing portion disposed upon the force transducer. The second surface of the support portion is substantially perpendicular to the first surface of the support portion and is configured to support or is arranged at least proximate a side surface of one or more of the force transducer, the securing portion and a tire pressure monitor connected to the valve. The second surface is substantially parallel to the installation axis of the stemming device.

In some implementations, the stemming system may further include a carrier portion connected to the base portion. The carrier portion may be an end effector of a robotic device having a robotic arm.

In some examples, the robotic device is a component of a wheel processing system including a wheel conveyor that moves a plurality of wheels past the robotic device such that the robotic device may dispose the valve within the valve hole of the wheel. The wheel processing system further includes a conveyor controller connected to a conveyor switch that is operable for advancing at least one inadequately stemmed wheel from a first direction along the wheel conveyor to a second direction along a rejection conveyor to a reject station.

In some instances, the valve-engaging portion further includes a plurality of linear servos. The plurality of linear servos may be connected to the base portion.

In some implementations, the plurality of linear servos are components of a wheel processing system including a wheel conveyor that moves a plurality of wheels past the plurality of linear servos such that the plurality of linear servos may dispose the valve within the valve hole of the wheel. The wheel processing system further includes a conveyor controller connected to a conveyor switch that is operable for advancing at least one inadequately stemmed wheel from a first direction along the wheel conveyor to a second direction along a rejection conveyor to a reject station.

Yet another aspect of the disclosure provides a method of electronically providing stemming adequacy information pertaining to performance of a stemming device that is configured to secure a valve including a tire pressure monitor to a wheel. Memory hardware is in communication with data processing hardware. The memory hardware stores instructions that when executed on the data processing hardware cause the data processing hardware to perform operations The operations include executing a program configured for communicating a stemming adequacy indicator pertaining to performance of the stemming device that is configured to secure the valve including the tire pressure monitor to the wheel.

Implementations of the disclosure may include one or more of the following optional features. For example, the communicating the stemming adequacy indicator step includes displaying on a screen in communication with the data processing hardware a graphical user interface having a visual indicator. The visual indicator displayed on the screen includes one or more of: a symbol; text; and a graphical representation of a valve insertion force signal that is graphed with an applied statistical technique. In other examples, the communicating the stemming adequacy indicator step includes audibly announcing from a speaker in communication with the data processing hardware an audible indicator. The audible indicator announced from the speaker includes one or more of: a synthesized voice; a pleasant sound indicating an adequate securing of the valve to the wheel; and an unpleasant sound indicating an inadequate securing of the valve to the wheel.

In some instances, the operations further include receiving at a conveyor controller in communication with the data processing hardware an automatically-provided sorting signal related to a stemming inadequacy indicator of the stemming adequacy indicator for causing a wheel-carrying conveyor to segregate at least one inadequately stemmed wheel from a population of adequately stemmed wheels. In some implementations, the operations further include receiving at a conveyor switch in communication with the conveyor controller a switch operation signal for advancing the at least one inadequately stemmed wheel from a first direction along the wheel-carrying conveyor to a second direction along a rejection conveyor to a reject station.

In other implementations, the operations further include, in response to a user input signal provided from a user input device, receiving at a conveyor controller in communication with the data processing hardware a manually-provided sorting signal related to a stemming inadequacy indicator of the stemming adequacy indicator for causing a wheel-carrying conveyor to segregate at least one inadequately stemmed wheel from a population of adequately stemmed wheels. In some examples, the operations further include receiving at a conveyor switch in communication with the conveyor controller a switch operation signal for advancing the at least one inadequately stemmed wheel from a first direction along the wheel-carrying conveyor to a second direction along a rejection conveyor to a reject station.

The details of one or more implementations of the disclosure are set forth in the accompanying drawings and the description below. Other aspects, features, and advantages will be apparent from the description and drawings, and from the claims.

DETAILED DESCRIPTION OF THE INVENTION

The figures illustrate an exemplary implementation of a stemming device, a stemming system including a stemming device and a wheel processing system including the same.

Based on the foregoing, it is to be generally understood that the nomenclature used herein is simply for convenience and the terms used to describe the invention should be given the broadest meaning by one of ordinary skill in the art.

Figure 9:
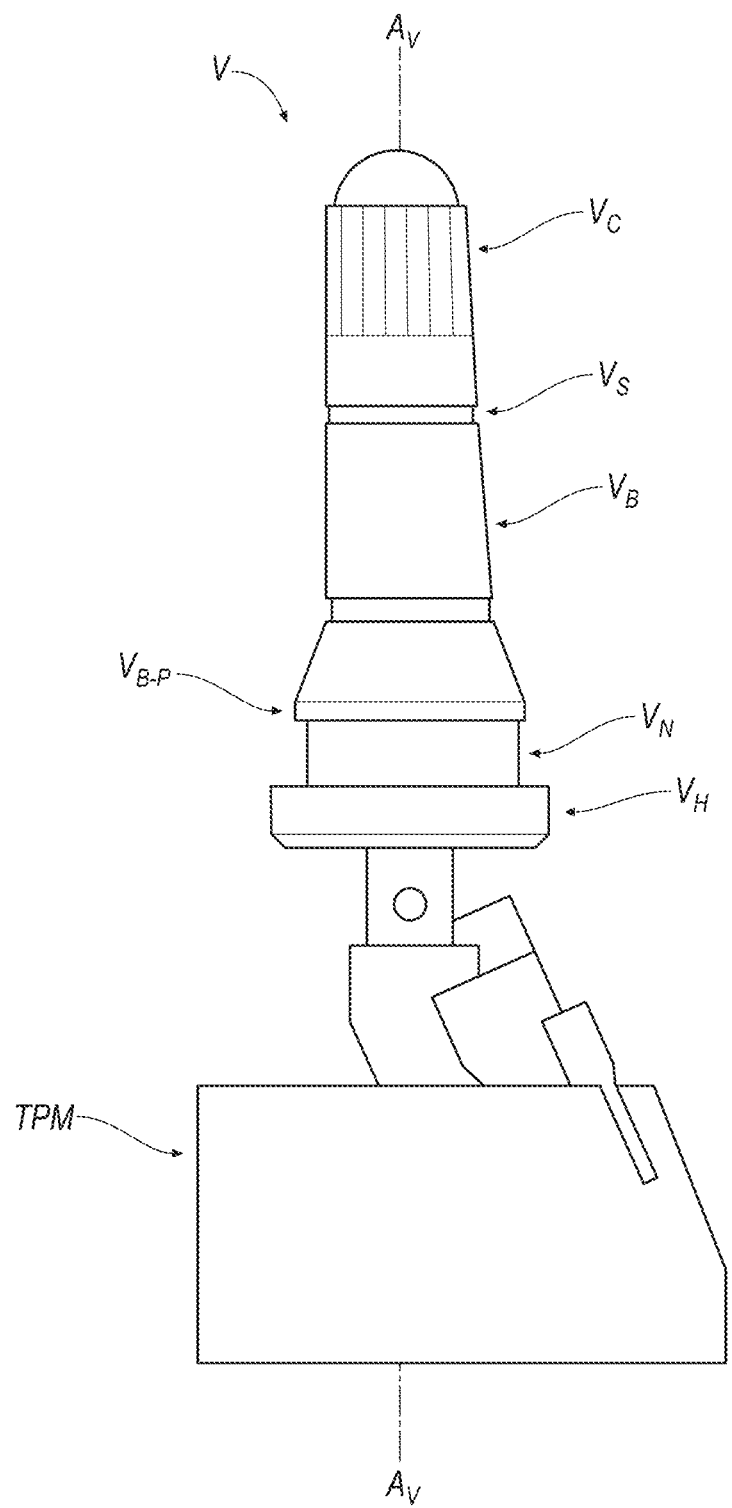
FIG. 9 is a side view of an exemplary valve including an exemplary tire pressure monitor.
Figure 10A:
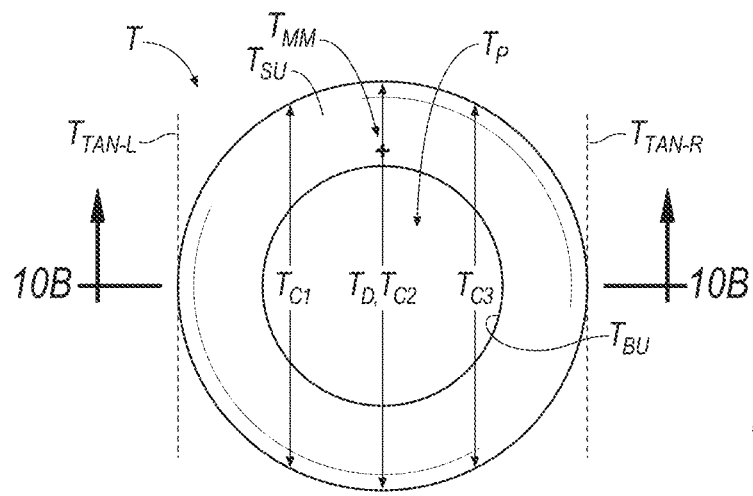
FIG. 10A is a top view of an exemplary tire.
Figure 11A:
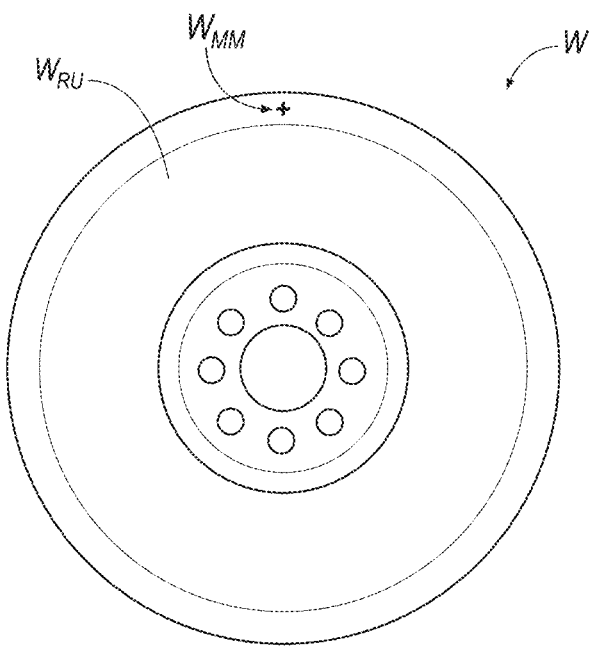
FIG. 11A is a top view of an exemplary wheel.
Figure 11B:
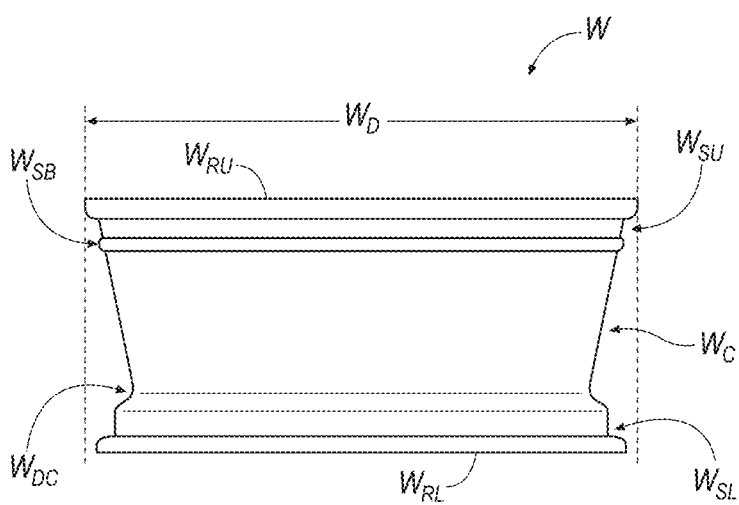
FIG. 11B is a side view of the wheel of FIG. 11A.
Figure 12:
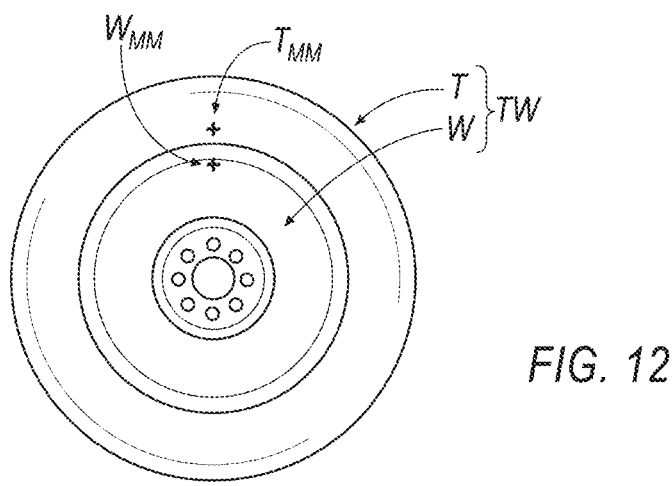
FIG. 12 is a top view of the tire of FIGS. 10A-10D joined to the wheel of FIGS. 11A-11B.

Prior to describing embodiments of the invention, reference is made to FIG. 9, which illustrates an exemplary valve V that is utilized for inflating a circumferential air cavity $T_{AC}$ (see, e.g., FIG. 10B) of a tire T (see, e.g., FIGS. 10A-10D) that is secured to a wheel (see, e.g., FIGS. 11A-11B) that forms a tire-wheel assembly TW (see, e.g., FIG. 12). In some instances, the valve V may be referred to as a "snap-in valve." The valve V may be generally defined by a valve stem $V_S$ and a rubber valve body $V_B$ covering the valve stem $V_S$. An axis $A_V$-$A_V$ extends through an axial center of the valve stem $V_S$. A valve cap $V_C$ may be threadingly-coupled to the valve stem $V_S$.

The valve V may be further defined by a neck portion $V_N$ and a ring-shaped head portion $V_H$ protruding from a proximal end $V_{B-P}$ of the rubber valve body $V_B$. In an example, the neck portion $V_N$ is defined by a smaller diameter than each of the ring-shaped head portion $V_H$ and the proximal end $V_{B-P}$ of the rubber valve body $V_B$; furthermore, the ring-shaped head portion $V_H$ may be defined by a diameter that is greater than the proximal end $V_{B-P}$ of the rubber valve body $V_B$.

Figure 2:
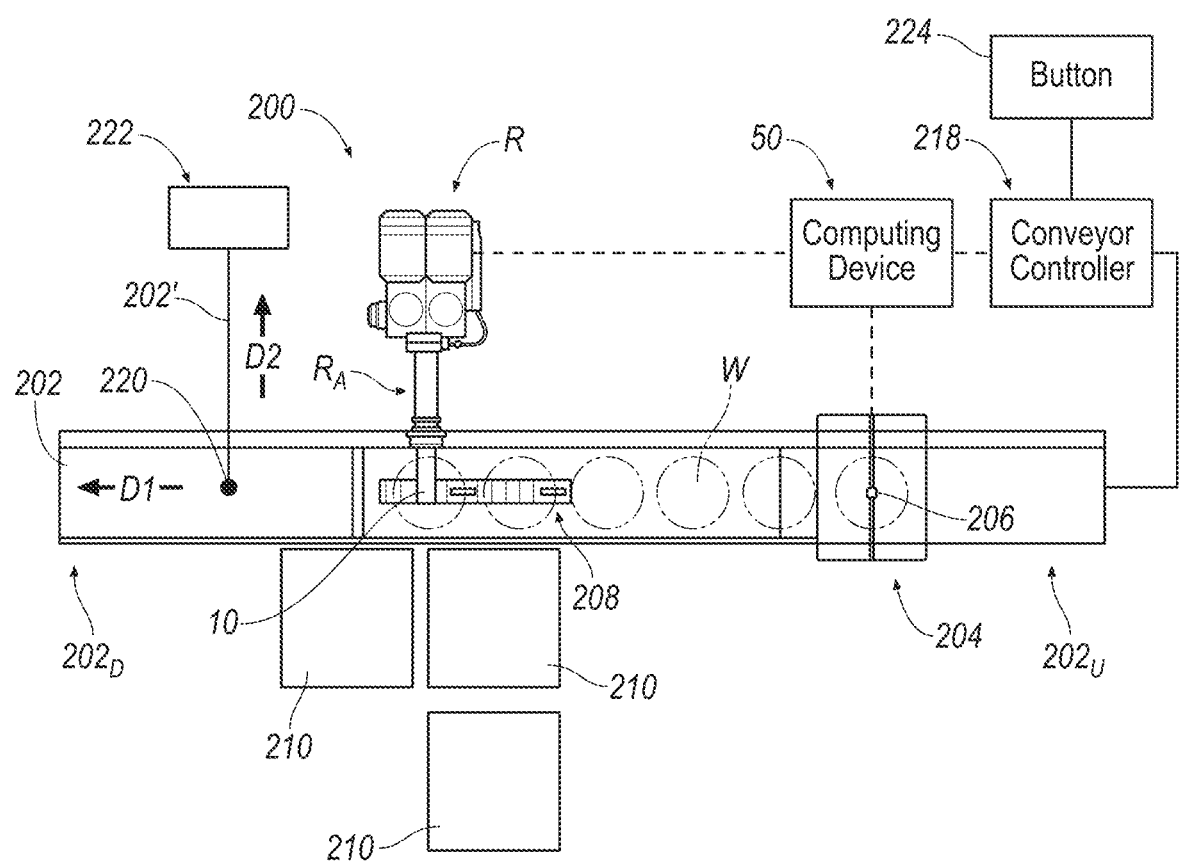
FIG. 2 is a top plan view of an exemplary wheel processing system including the stemming device and computing device of FIG. 1.
Figure 3:
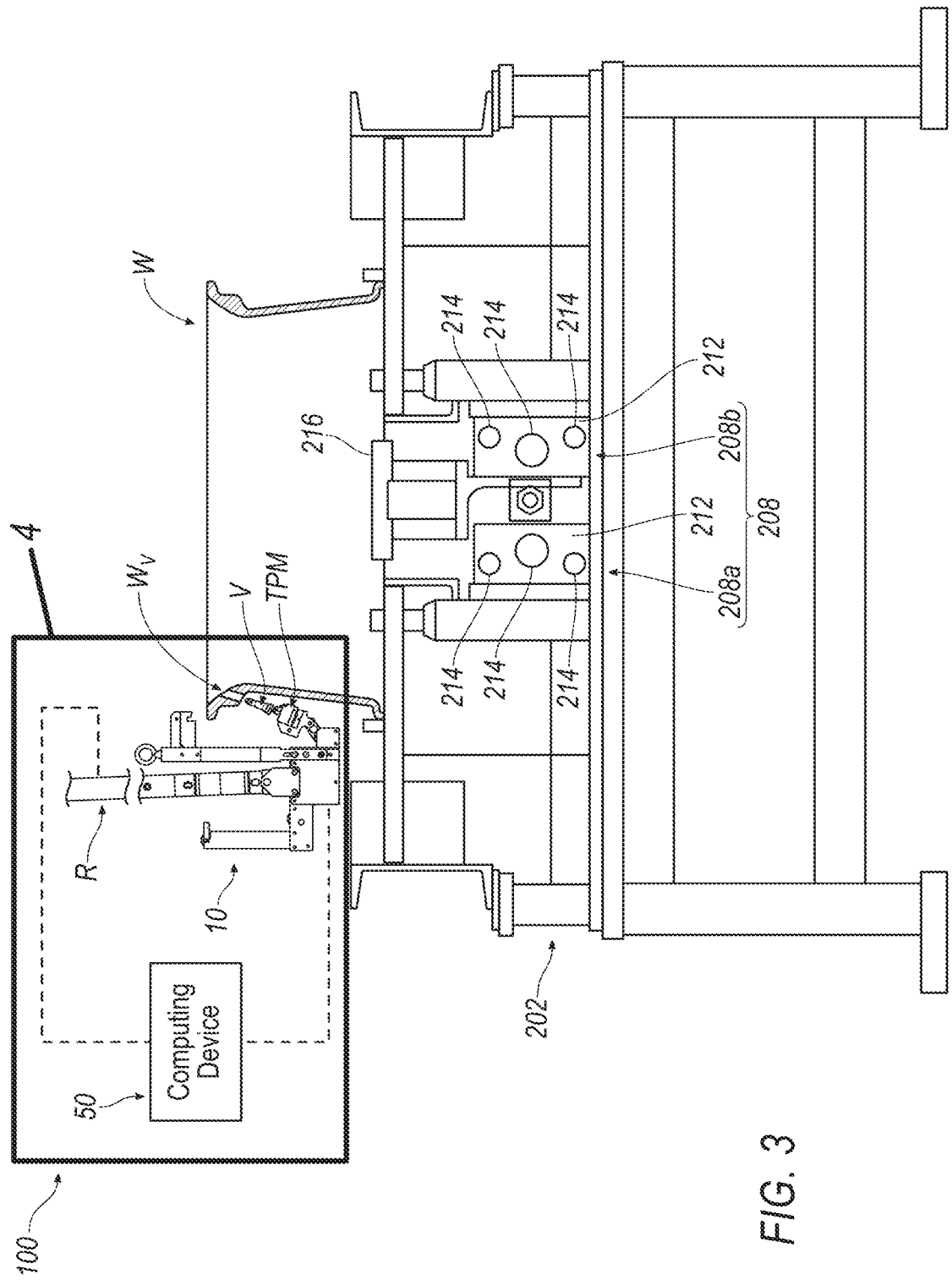
FIG. 3 is an end view of the exemplary wheel processing system of FIG. 2.
Figure 4:
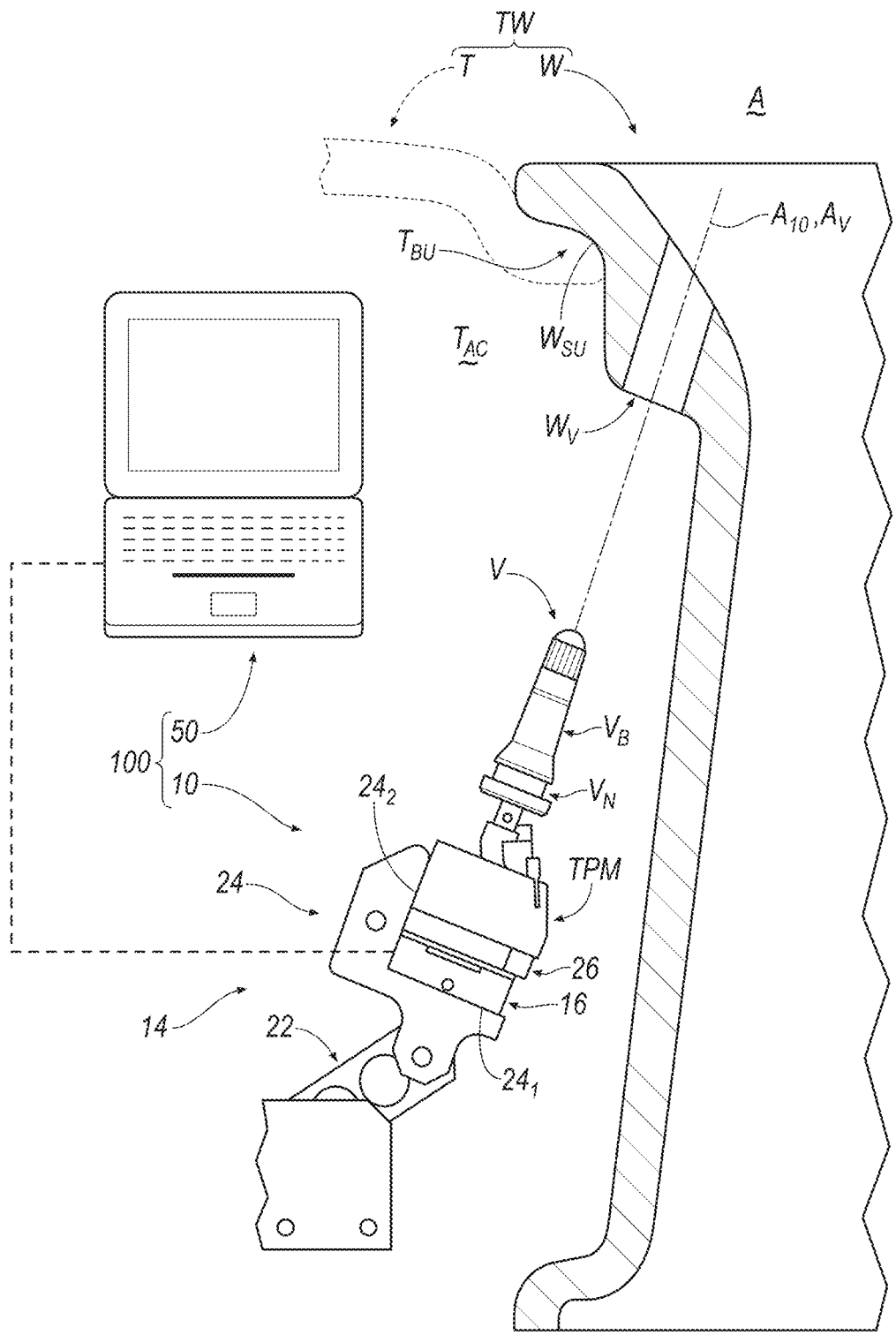
FIG. 4 is an enlarged view of a portion of a wheel, the valve including the tire pressure monitor removably-secured to the stemming device and the computing device according to line 4 of FIG. 3.
Figure 5B:
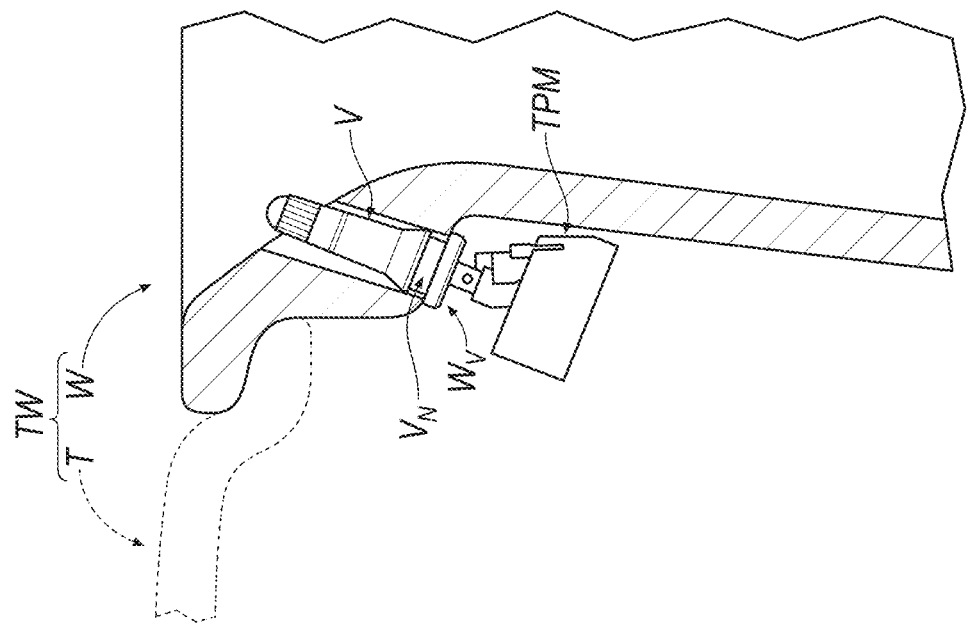
FIG. 5B is an enlarged view of the valve including the tire pressure monitor adequately-secured to the wheel by the stemming device according to FIG. 5A.
Figure 5A:
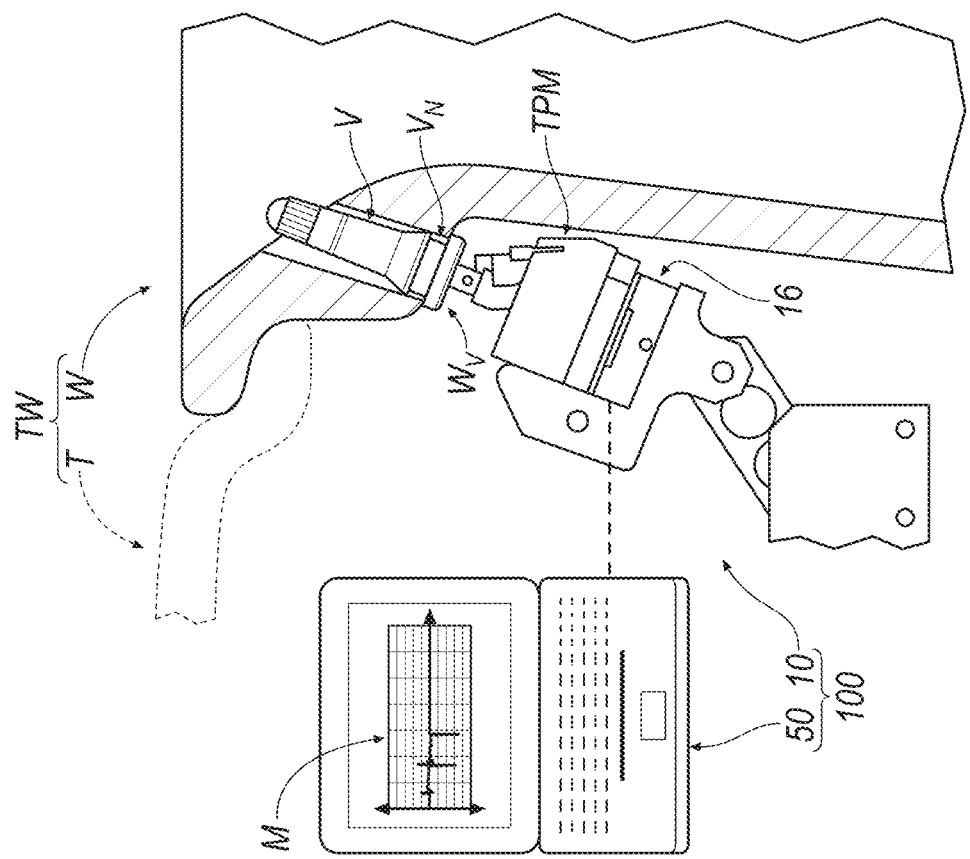
FIG. 5A is an enlarged view of the computing device communicatively-coupled to the stemming device that is adequately-securing the valve including the tire pressure monitor to the wheel according to FIG. 4.

As will be described in the following disclosure at FIGS. 1-5D, an exemplary stemming device 10 communicatively-coupled to a computing device 50 may define a stemming system 100 that is configured for joining the valve V to the wheel W by: as seen in FIG. 4, axially-aligning the rubber valve body $V_B$ of the valve V with a valve hole $W_V$ that is bored through the wheel W; then, as seen in FIG. 5A, inserting the rubber valve body $V_B$ of the valve V into the valve hole $W_V$ and urging the rubber valve body $V_B$ of the valve V through the valve hole $W_V$ and, as seen in FIGS. 5A-5B, registering the neck portion $V_N$ of the valve V within the valve hole $W_V$ of the wheel W such that the valve V is adequately-secured to the wheel W. After the valve V is adequately-secured to the wheel W, the valve V seals the valve hole $W_V$ from surrounding atmosphere A for maintaining pressure within the circumferential air cavity $T_{AC}$ of the tire T for keeping the tire-wheel assembly TW in an inflated state. Furthermore, a tire pressure monitor TPM may be secured to the ring-shaped head portion $V_H$ of the valve V such that upon inflation of the tire-wheel assembly TW, the tire pressure monitor TPM, which is arranged within the circumferential air cavity $T_{AC}$ of the tire T, may wirelessly communicate a sensed pressure of the circumferential air cavity $T_{AC}$ to, for example, a receiver of a vehicle computer (not shown).

The terms "adequate" or "adequately" as applied to result of the valve V being adequately-secured to the wheel W may be defined as what is described above. In a first example, the terms "adequate" or "adequately" as applied to result of the valve V being adequately-secured to the wheel W may be defined as a conditional state of the assembly such that when the valve V is connected to the wheel W, the valve V will seal the valve hole $W_V$ from surrounding atmosphere A for maintaining pressure within the circumferential air cavity $T_{AC}$ of the tire T for keeping a subsequently-assembled and inflated tire-wheel assembly TW in an inflated state). In another example, the terms "adequate" or "adequately" as applied to result of the valve V being adequately-secured to the wheel W may be defined as a conditional state of the assembly such that when the valve V is connected to the wheel W, the tire pressure monitor TPM, which is arranged within the circumferential air cavity $T_{AC}$ of the tire T, may be able to wirelessly communicate a sensed pressure of the circumferential air cavity $T_{AC}$ (that is inflated or pressurized at a pressure above surrounding atmosphere A) to, for example, a receiver of a vehicle computer (not shown). In yet another example, the terms "adequate" or "adequately" as applied to result of the valve V being adequately-secured to the wheel W may be defined as a conditional state of the assembly such that when the valve V is connected to the wheel W, the valve V will seal the valve hole $W_V$ from surrounding atmosphere A, and the tire pressure monitor TPM, which is arranged within the circumferential air cavity $T_{AC}$ of the tire T, may be able to wirelessly communicate a sensed pressure of the circumferential air cavity $T_{AC}$ (that is inflated or pressurized at a pressure above surrounding atmosphere A) to, for example, a receiver of a vehicle computer (not shown).

The terms "inadequate" or "inadequately" as applied to result of the valve V being inadequately-secured to the wheel W may be defined as follows. In a first example, the terms "inadequate" or "inadequately" as applied to result of the valve V being inadequately-secured to the wheel W may be defined as a conditional state of the assembly such that when the valve V is connected to the wheel W, the valve V will not seal the valve hole $W_V$ from surrounding atmosphere A, and, as a result, will not maintain pressure within the circumferential air cavity $T_{AC}$ of the tire T and therefore not keep a subsequently-assembled and inflated tire-wheel assembly TW in an inflated state). In another example, the terms "inadequate" or "inadequately" as applied to result of the valve V being inadequately-secured to the wheel W may be defined as a conditional state of the assembly such that when the valve V is connected to the wheel W, the tire pressure monitor TPM, which is arranged within the circumferential air cavity $T_{AC}$ of the tire T, may not be able to wirelessly communicate a sensed pressure of the circumferential air cavity $T_{AC}$ (that is not inflated or pressurized at a pressure above surrounding atmosphere A) to, for example, a receiver of a vehicle computer (not shown). In yet another example, the terms "inadequate" or "inadequately" as applied to result of the valve V being inadequately-secured to the wheel W may be defined as a conditional state of the assembly such that when the valve V is connected to the wheel W, the valve V will not seal the valve hole $W_V$ from surrounding atmosphere A, and the tire pressure monitor TPM, which is arranged within the circumferential air cavity $T_{AC}$ of the tire T, may not be able to wirelessly communicate a sensed pressure of the circumferential air cavity $T_{AC}$ (that is not inflated or pressurized at a pressure above surrounding atmosphere A) to, for example, a receiver of a vehicle computer (not shown).

Prior to describing embodiments of the invention, reference is made to FIGS. 10A-10D, which illustrates an exemplary tire T. In the present disclosure, reference may be made to the "upper," "lower," "left," "right" and "side" of the tire T; although such nomenclature may be utilized to describe a particular portion or aspect of the tire T, such nomenclature may be adopted due to the orientation of the tire T with respect to structure that supports the tire T. Accordingly, the above nomenclature should not be utilized to limit the scope of the claimed invention and is utilized herein for exemplary purposes in describing an embodiment of the invention.

In an embodiment, the tire T includes an upper sidewall $T_{SU}$ (see, e.g., FIG. 10A), a lower sidewall $T_{SL}$ (see, e.g., FIG. 10D) and a tread surface $T_T$ (see, e.g., FIGS. 10B-10C), that joins the upper sidewall $T_{SU}$ to the lower sidewall $T_{SL}$ Referring to FIG. 10B, the upper sidewall $T_{SU}$ may rise away from the tread surface $T_T$ to a peak and subsequently descend at a slope to terminate at and form a circumferential upper bead, $T_{BU}$; similarly, the lower sidewall $T_{SL}$ may rise away from the tread surface $T_T$ to a peak and subsequently descend at a slope to terminate at and form a circumferential lower bead $T_{BL}$.

Figure 10B:
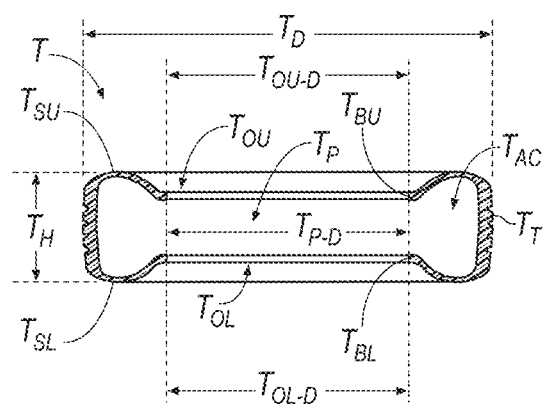
FIG. 10B is a cross-sectional view of the tire according to line 10B-10B of FIG. 10A.

As seen in FIG. 10B, when the tire T is in a relaxed, unbiased state, the upper bead $T_{BU}$ forms a circular, upper tire opening $T_{OU}$; similarly, when the tire T is in a relaxed, unbiased state, the lower bead $T_{BL}$ forms a circular, lower tire opening, $T_{OL}$. It will be appreciated that when an external force is applied to the tire T, the tire T may be physically manipulated, and, as a result, one or more of the upper tire opening $T_{OU}$ and the lower tire opening $T_{OL}$ may be temporality upset such that one or more of the upper tire opening $T_{OU}$ and the lower tire opening $T_{OL}$ is/are not entirely circular, but, may, for example, be manipulated to include an oval shape.

Figure 10C:
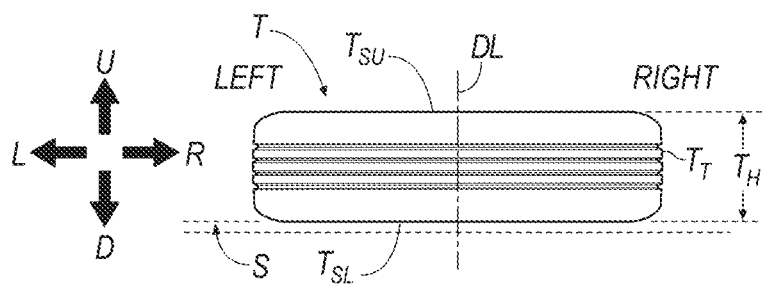
FIG. 10C is a side view of the tire of FIG. 10A.
Figure 10D:
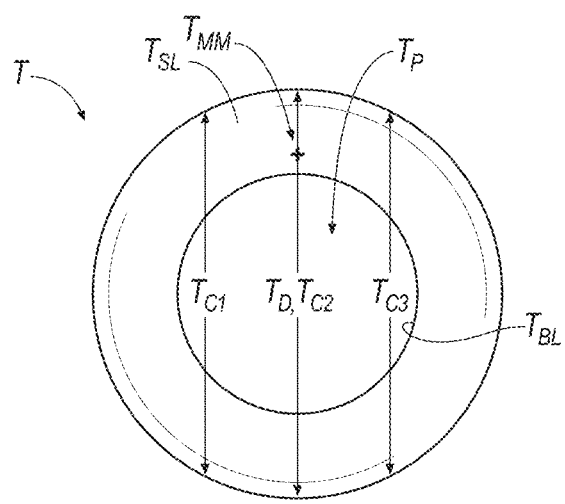
FIG. 10D is a bottom view of the tire of FIG. 10A.

Referring to FIGS. 10A and 10D, when in the relaxed, unbiased state, each of the upper tire opening $T_{OU}$ and the lower tire opening $T_{OL}$ form, respectively, an upper tire opening diameter $T_{OU-D}$ and a lower tire opening diameter $T_{OL-D}$. Further, as seen in FIGS. 10A and 10D, when in the relaxed, unbiased state, the upper sidewall $T_{SU}$ and the lower sidewall $T_{SL}$ define the tire T to include a tire diameter $T_D$.

Referring to FIGS. 10A-10B and 10D, the tire T also includes a passage $T_P$. Access to the passage $T_P$ is permitted by either of the upper tire opening $T_{OU}$ and the lower tire opening $T_{OL}$ Referring to FIG. 10B, when the tire T is in a relaxed, unbiased state, the upper tire opening $T_{OU}$ and the lower tire opening $T_{OL}$ define the passage $T_P$ to include a diameter $T_{P-D}$. Referring also to FIG. 10B, the tire T includes a circumferential air cavity $T_{AC}$ that is in communication with the passage $T_P$. After joining the tire T to a wheel W (see, e.g., FIGS. 11A-11B, pressurized air is deposited into the circumferential air cavity $T_{AC}$ for inflating the tire T, thereby forming a tire-wheel assembly TW (see, e.g., FIG. 12).

When the tire T is arranged adjacent structure or a wheel W, as described in the following disclosure, the written description may reference a "left" portion or a "right" portion of the tire T. Referring to FIG. 10C, the tire T is shown relative to a support member S; the support member S is provided (and shown in phantom) in order to establish a frame of reference for the "left" portion and the "right" portion of the tire T. In FIG. 10C, the tire T is arranged in a "non-rolling" orientation such that the tread surface $T_T$ is not disposed adjacent the phantom support member S but, rather, the lower sidewall $T_{SL}$ is disposed adjacent the phantom support member S. A center dividing line DL equally divides the "non-rolling" orientation of the tire T in half in order to generally indicate a "left" portion of the tire T and a "right" portion of the tire T.

As discussed above, reference is made to several diameters $T_{P-D}$, $T_{OU-D}$, $T_{OL-D}$ of the tire T. According to geometric theory, a diameter passes through the center of a circle, or, in the present disclosure, the axial center of the tire T, which may alternatively be referred to as an axis of rotation of the tire T. Geometric theory also includes the concept of a chord, which is a line segment that whose endpoints both lie on the circumference of a circle; accordingly, a diameter is the longest chord of a circle.

In the following description, the tire T may be moved relative to structure; accordingly, in some instances, a chord of the tire T may be referenced in order to describe an embodiment of the invention. Referring to FIG. 10A, several chords of the tire T are shown generally at $T_{C1}$, $T_{C2}$ (i.e., the tire diameter, $T_D$) and $T_{C3}$. The chord $T_{C1}$ may be referred to as a "left" tire chord. The chord $T_{C3}$ may be referred to as a "right" tire chord. The chord $T_{C2}$ may be equivalent to the tire diameter $T_D$ and be referred to as a "central" chord. Both of the left and right tire chords $T_{C1}$, $T_{C3}$, include a geometry that is less than central chord $T_{C2}$/tire diameter $T_D$.

In order to reference the location of the left chord $T_{C1}$ and the right chord $T_{C3}$ reference is made to a left tire tangent line $T_{TAN-L}$ and a right tire tangent line $T_{TAN-R}$. The left chord $T_{C1}$ is spaced apart approximately one-fourth (¼) of the tire diameter $T_D$ from the left tire tangent line $T_{TAN-L}$. The right chord $T_{C3}$ is spaced apart approximately one-fourth (¼) of the tire diameter $T_D$ from the right tire tangent line $T_{TAN-R}$. Each of the left and right tire chords $T_{C1}$, $T_{C3}$ may be spaced apart about one-fourth (¼) of the tire diameter $T_D$ from the central chord $T_{C2}$. The above spacings referenced from the tire diameter $T_D$ are exemplary and should not be meant to limit the scope of the invention to approximately a one-fourth (¼) ratio; accordingly, other ratios may be defined, as desired.

Further, as will be described in the following disclosure, the tire, T, may be moved relative to structure. Referring to FIG. 10C, the movement may be referenced by an arrow U to indicate upwardly movement or an arrow D to indicate downwardly movement. Further, the movement may be referenced by an arrow L to indicate left or rearwardly movement or an arrow R to indicate right or forwardly movement.

Prior to describing embodiments of the invention, reference is made to FIGS. 11A-11B, which illustrate an exemplary wheel W. In the present disclosure, reference may be made to the "upper," "lower," "left," "right" and "side" of the wheel W; although such nomenclature may be utilized to describe a particular portion or aspect of the wheel W, such nomenclature may be adopted due to the orientation of the wheel W with respect to structure that supports the wheel W. Accordingly, the above nomenclature should not be utilized to limit the scope of the claimed invention and is utilized herein for exemplary purposes in describing an embodiment of the invention.

In an embodiment, the wheel W includes an upper rim surface $W_{RU}$ a lower rim surface $W_{RL}$ and an outer circumferential surface $W_C$ that joins the upper rim surface $W_{RU}$ to the lower rim surface $W_{RL}$ Referring to FIG. 11B, the upper rim surface $W_{RU}$ forms a wheel diameter $W_D$. The wheel diameter $W_D$ may be non-constant about the circumference $W_C$ from the upper rim surface $W_{RU}$ to the lower rim surface $W_{RL}$ The wheel diameter $W_D$ formed by the upper rim surface $W_{RU}$ may be largest diameter of the non-constant diameter about the circumference $W_C$ from the upper rim surface $W_{RU}$ to the lower rim surface $W_{RL}$ The wheel diameter $W_D$ is approximately the same as, but slightly greater than the diameter $T_{P-D}$ of the passage $T_P$ of the tire T; accordingly, once the wheel W is disposed within the passage $T_P$, the tire T may flex and be frictionally-secured to the wheel W as a result of the wheel diameter $W_D$ being approximately the same as, but slightly greater than the diameter $T_{P-D}$ of the passage $T_P$ of the tire T.

The outer circumferential surface $W_C$ of the wheel W further includes an upper bead seat $W_{SU}$ and a lower bead seat $W_{SL}$. The upper bead seat $W_{SU}$ forms a circumferential cusp, corner or recess that is located proximate the upper rim surface $W_{RU}$ The lower bead seat $W_{SL}$ forms a circumferential cusp, corner or recess that is located proximate the lower rim surface $W_{RL}$. Upon inflating the tire T the pressurized air causes the upper bead $T_{BU}$ to be disposed adjacent and "seat" in the upper bead seat $W_{SU}$; similarly, upon inflating the tire T, the pressurized air causes the lower bead $T_{BL}$ to be disposed adjacent and "seat" in the lower bead seat $W_{SL}$.

The non-constant diameter of the outer circumference $W_C$ of the wheel W further forms a wheel "drop center" $W_{DC}$. A wheel drop center $W_{DC}$ may include the smallest diameter of the non-constant diameter of the outer circumference $W_C$ of the wheel W. Functionally, the wheel drop center $W_{DC}$ may assist in the mounting of the tire T to the wheel W.

The non-constant diameter of the outer circumference $W_C$ of the wheel W further forms an upper "safety bead" $W_{SB}$. In an embodiment, the upper safety bead $W_{SB}$ may be located proximate the upper bead seat $W_{SU}$. In the event that pressurized air in the circumferential air cavity $T_{AC}$ of the tire T escapes to atmosphere the upper bead $T_{BU}$ may "unseat" from the upper bead seat $W_{SU}$; because of the proximity of the safety bead $W_{SB}$, the safety bead $W_{SB}$ may assist in the mitigation of the "unseating" of the upper bead $T_{BU}$ from the upper bead seat $W_{SU}$ by assisting in the retaining of the upper bead $T_{BU}$ in a substantially seated orientation relative to the upper bead seat $W_{SU}$. In some embodiments the wheel W may include a lower safety bead; however, upper and/or lower safety beads may be included with the wheel W, as desired, and are not required in order to practice the invention described in the following disclosure.

Referring to FIG. 1, an exemplary stemming device is shown generally at 10. The stemming device 10 is communicatively-coupled to a computing device 50 for defining a stemming system 100. As seen in FIGS. 2-3, the stemming system 100 may define a portion of an exemplary wheel processing system 200 that prepares (e.g., performs the steps of stemming, soaping/lubricating and the like) a wheel W prior to joining a tire T to the wheel W for forming a tire-wheel assembly TW.

Figure 13:
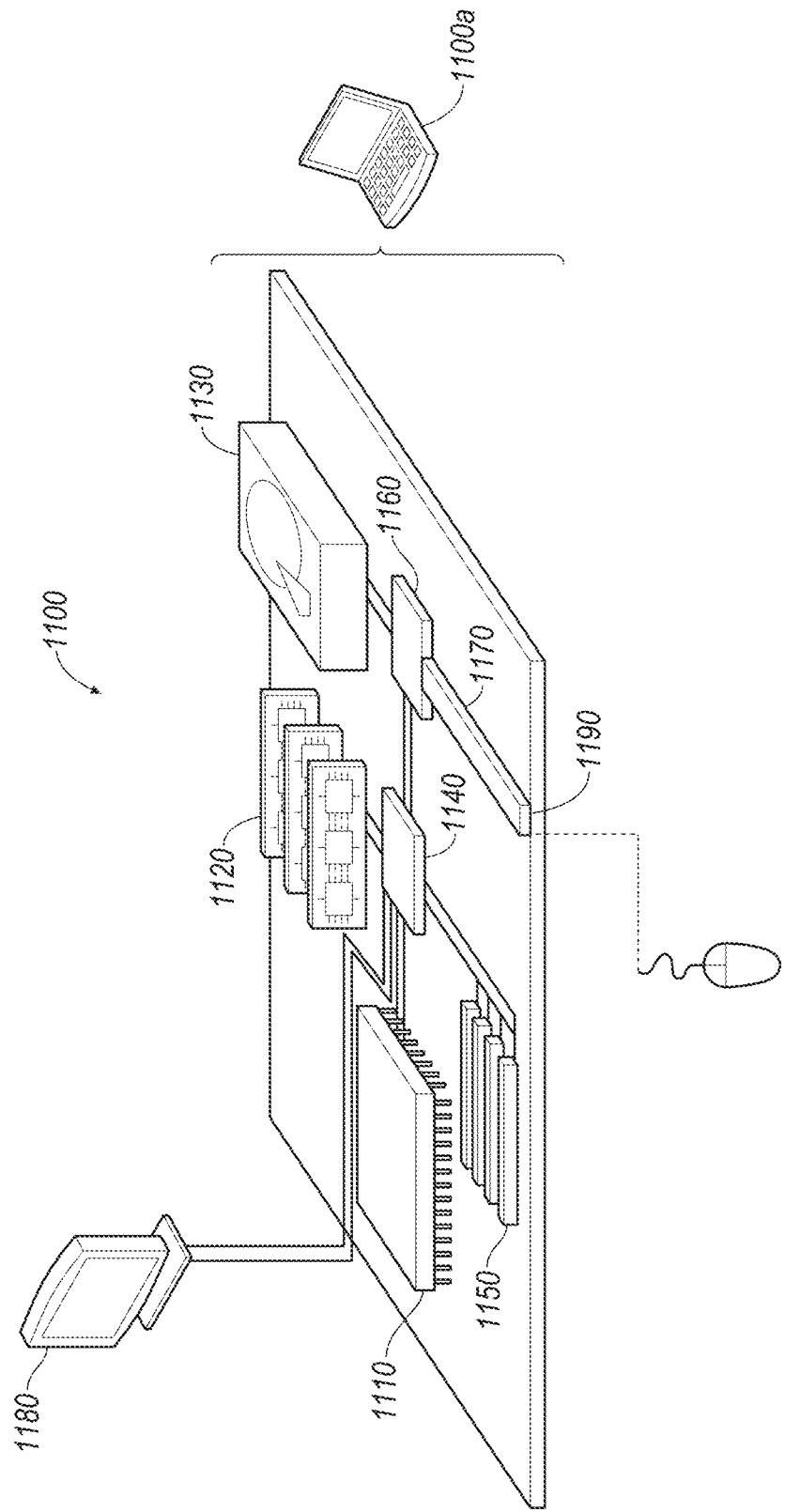
FIG. 13 is a schematic view of an example computing device that may be used to implement the systems and methods described herein.

With reference to FIG. 13, the computing device 50 may be, for example, a digital computer including data processing hardware (see, e.g., processor 1110) and memory hardware (see, e.g., memory 1120) in communication with the data processing hardware. Furthermore, the data processing hardware may include a receiver for receiving signals and a transmitter for sending signals. The digital computer may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)). The computing device 50 may be communicatively-coupled (e.g., wirelessly or hardwired by, for example, one or more communication conduits) to, for example, a characteristic signature database including one or more force rate signals indicative of an adequate installation of one or more types of valves V and tire pressure monitors TPM to one or more types of wheels W.

Figure 5C:
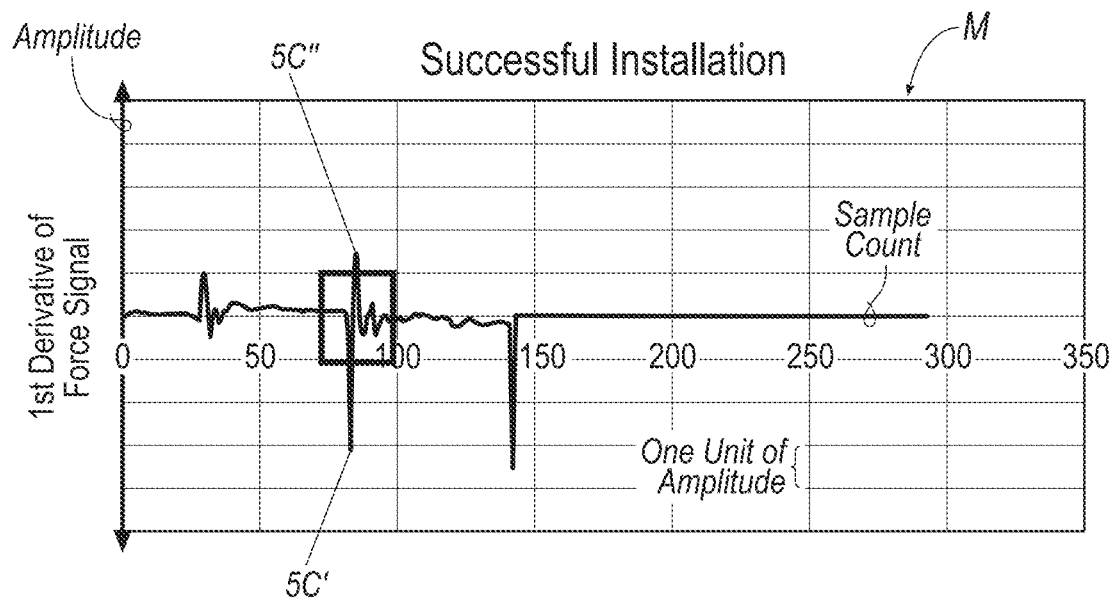
FIG. 5C is an exemplary force signal communicated from the stemming device to the computing device in association with the stemming device adequately-securing the valve including the tire pressure monitor to the wheel.
Figure 6C:
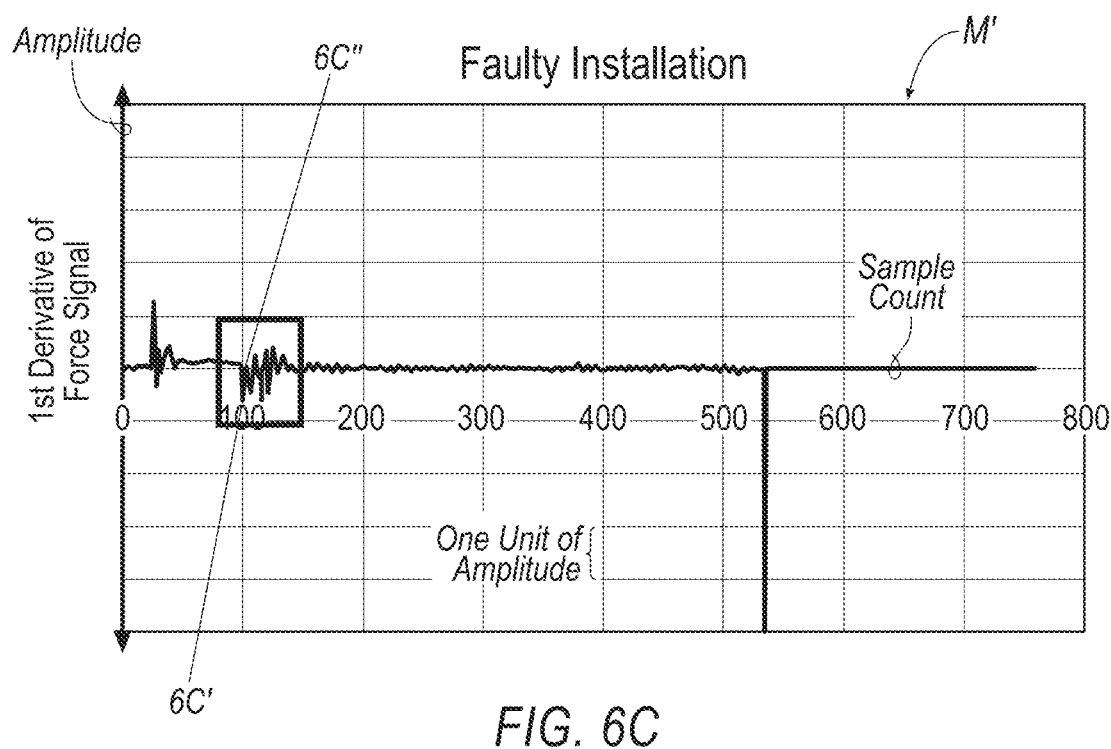
FIG. 6C is an exemplary force signal communicated from the stemming device to the computing device in association with the stemming device inadequately-securing the valve including the tire pressure monitor to the wheel.

As seen in FIG. 1, the stemming device 10 includes a base portion 12 and a valve-engaging portion 14. As will be described in the following disclosure, the valve-engaging portion 14 includes a force transducer 16 (e.g., a load cell) that obtains a measurement M/M' (e.g., an applied axial force over time throughout a process of joining the valve V to the wheel W as seen in FIGS. 5C and 6C) imparted by the valve-engaging portion 14 to the wheel W by way of the valve V and the tire pressure monitor TPM. The measurement M/M' is recorded by the computing device 50. Furthermore, the computing device 50 may include an algorithm that analyzes a data signature associated with the measurement M/M' to determine if the valve V was adequately or inadequately installed by the stemming device 10.

Although the stemming device 10 is described above to include a force transducer 16 that obtains a measurement M/M' imparted by the valve-engaging portion 14 to the wheel W by way of the valve V and the tire pressure monitor TPM, the stemming device 10 may include other or additional data-obtaining components. In an example, the stemming device 10 may also include a displacement (travel) transducer that provides additional information for greater defect discrimination possibilities.

The stemming device 10 may optionally include a carrier portion 18 connected to the base portion 12. The stemming device 10 may further optionally include a wheel-engaging portion 20 connected to the base portion 12.

In an example, the carrier portion 18 may define an end effector or a distal end of a robotic device R (see e.g., FIG. 2) having a robotic arm RA for performing steps associated with an automatic installation of the valve V on the wheel W. In other examples, the carrier portion 18 may be represented by a bar or flange that may be held in the hand of a user for manual installation of the valve V on the wheel W. Regardless of a desired implementation or design of the carrier portion 18, the carrier portion 18 may include structure that permits movement (e.g., hinged movement, sliding movement and/or rotational movement) of the carrier portion 18 relative the base portion 12.

In an example, the wheel-engaging portion 20 may define a wheel clamping portion for securing the stemming device 10 to the wheel W prior to joining the valve V to the wheel W. The wheel-engaging portion 20 may include structure that permits movement (e.g., sliding movement) of the wheel-engaging portion 20 relative the base portion 12.

In addition to the force transducer 16, the valve-engaging portion 14 also includes an arm portion 22, a support portion 24 and a securing portion 26. The arm portion 22 may be rotatably-connected to the base portion 12. The support portion 24 may be rotatably-connected to the arm portion 22.

The support portion 24 is generally defined by a first surface 241 and a second surface 242. The first surface 241 directly supports the force transducer 16 and is substantially orthogonal to an installation axis $A_{10}$-$A_{10}$ of the stemming device 10. Furthermore, the installation axis $A_{10}$-$A_{10}$ of the stemming device 10 is axially aligned with the axis $A_V$-$A_V$ extending through the axial center of the valve stem $V_S$. Yet even further, the force transducer 16 may be said to be uniaxial or co-linear with the axis $A_V$-$A_V$ extending through the axial center of the valve stem $V_S$.

The second surface 242 is substantially perpendicular to the first surface 241 and is configured to support or is arranged at least proximate a side surface of one or more of the force transducer 16, the securing portion 26 and the tire pressure monitor TPM connected to the valve V. Furthermore, as seen in FIG. 1, the second surface 242 is substantially parallel to the installation axis $A_{10}$-$A_{10}$ of the stemming device 10.

The securing portion 26 may be disposed upon an upper surface $16_U$ of the force transducer 16 and is arranged opposite the first surface 241 of the support portion 24. The securing portion 26 may include attachment structure (not shown) for removably securing the tire pressure monitor TPM and the valve V to the valve-engaging portion of the stemming device 10.

Referring now to FIG. 2, an exemplary wheel processing system including the exemplary stemming device 10 communicatively-coupled to the computing device 50 is shown generally at 200. The wheel processing system 200 includes a conveyor 202 for moving a plurality of wheels W past a robotic device R. The computing device 50 may include memory and a processor for controlling movement of one or more of the robotic device R and the conveyor 202. The wheel processing system 200 installs a valve V including a tire pressure monitor TPM in the valve hole $W_V$ of each wheel W as the conveyor 202 moves each wheel W across the robotic device R from an upstream end $202_U$ of the conveyor 202 to a downstream end $202_D$ of the conveyor 202.

In some instances, during movement of each wheel W from the upstream end $202_U$ of the conveyor 202 to the downstream end $202_D$ of the conveyor 202, each wheel W may pass through an optional identification station 204. The identification station 204 may include a camera 206 for identifying each wheel W from a plurality of differently configured wheels. When a wheel W moves within the visual range of the camera 206, the camera 206 communicates an image of the wheel W to a controller that may be associated with, for example, the computing device 50. The image may include structural features of the wheel W including, for example, a location of the valve hole $W_V$ of the wheel W. In an example, the controller associated with the computing device 50 compares the image received from the camera 206 with a plurality of images stored in memory. The images in memory may correspond to any number of differently configured wheels W that may pass through the identification station 204. Each of the images stored in memory is associated with structural characteristics and physical dimensions of a corresponding wheel W. The controller associated with the computing device 50 may control processing steps performed by the robotic device R such as, for example, axially aligning (see, e.g., FIG. 4) the installation axis $A_{10}$-$A_{10}$ of the stemming device 10 with an axial center of the valve hole $W_V$ of the wheel W such that the axis $A_V$-$A_V$ extending through the axial center of the valve stem $V_S$ is also axially aligned with the axial center of the valve hole $W_V$ of the wheel W.

In some examples, the wheel processing system 200 may include a positioning device 208 disposed along the conveyor 202. The positioning device 208 may be located proximate the robotic device R for assisting in locating the wheel W in an optimal position in order to, for example, axially align the installation axis $A_{10}$-$A_{10}$ of the stemming device 10 with an axial center of the valve hole $W_V$ of the wheel W.

After the wheel W is positioned by the positioning device 208, the robotic device R may arrange the stemming device 10 proximate a valve bin 210 such that the securing portion 26 of the stemming device 10 may secure a valve V from the valve bin 210 to the stemming device 10. Thereafter, as seen in FIG. 4, the robotic device R positions the stemming device 10 relative the wheel W such that the installation axis $A_{10}$-$A_{10}$ (and, correspondingly, the axis $A_V$-$A_V$ extending through the axial center of the valve stem $V_S$) of the stemming device 10 is aligned with the axial center of the valve hole $W_V$ of the wheel W.

Referring to FIG. 3, the positioning device 208 may include a first positioning mechanism 208a and a second positioning mechanism 208b. Each of the first positioning mechanism 208a and the second positioning mechanism 208b includes a housing 212 defining apertures 214 for receiving guide tracks (not shown) of the conveyor 202. Once the wheel W is positioned by the positioning device 208 relative the conveyor 202, a wheel-engaging portion 216 may secure the wheel W relative the conveyor 202.

Figure 6A:
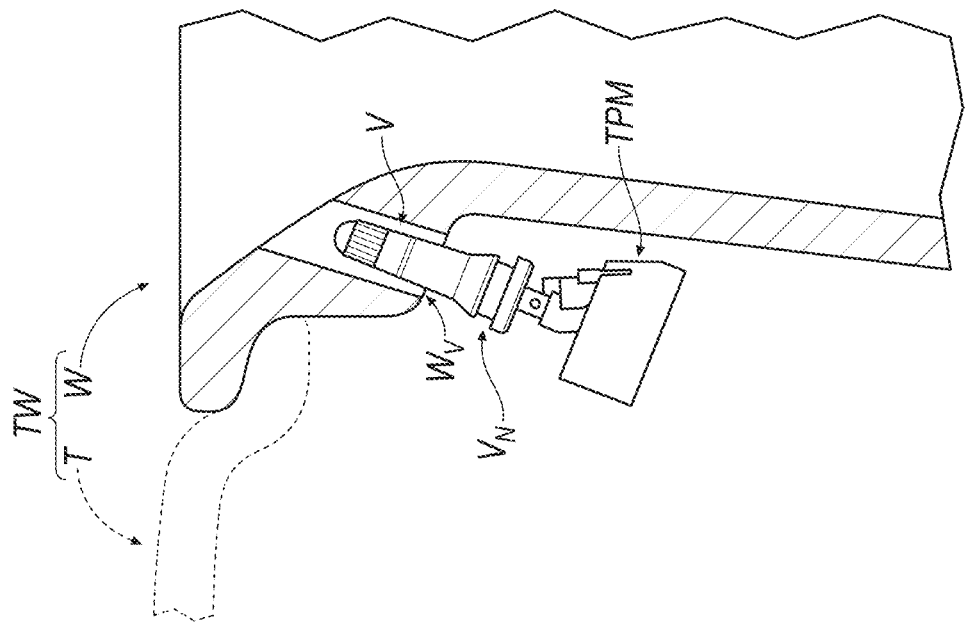
FIG. 6A is an enlarged view of the computing device communicatively-coupled to the stemming device that is inadequately-securing the valve including the tire pressure monitor to the wheel according to FIG. 4.
Figure 6B:
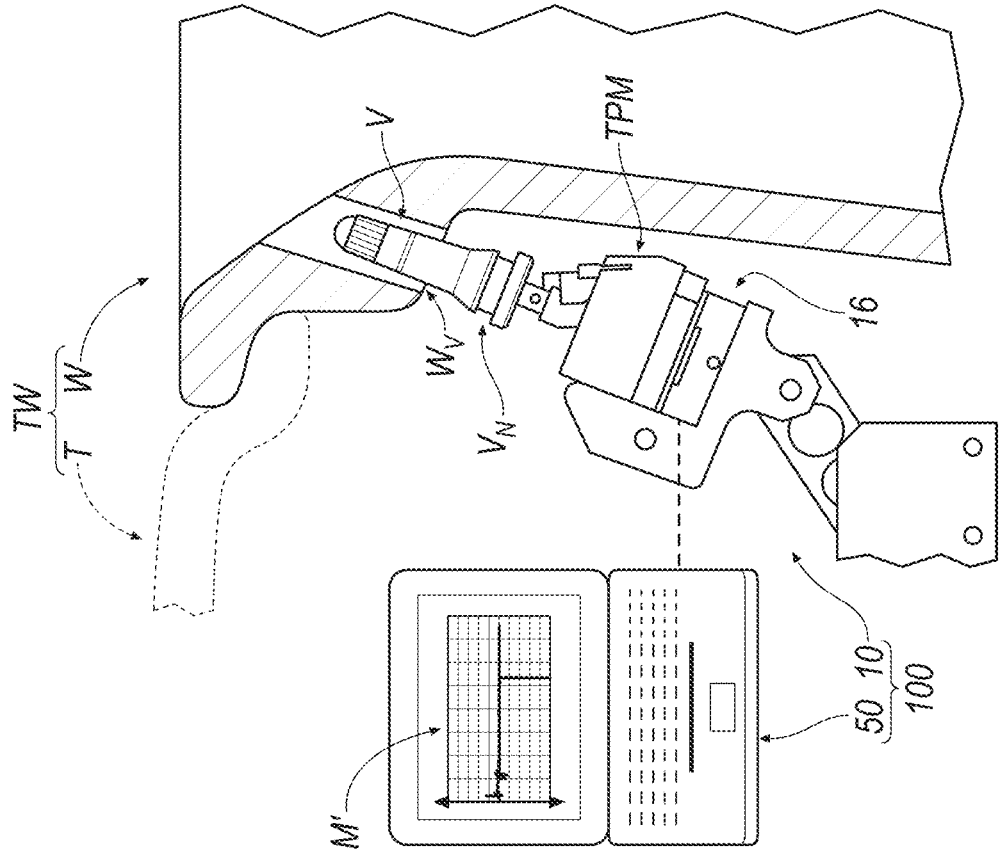
FIG. 6B is an enlarged view of the valve including the tire pressure monitor inadequately-secured to the wheel by the stemming device according to FIG. 5A.

Installation of the valve V and the tire pressure monitor TPM upon the wheel W is generally represented at FIGS. 5A-5B and FIGS. 6A-6B. The installation represented at FIGS. 5A-5B is generally defined by the valve V and tire pressure monitor TPM being adequately installed upon the wheel W; conversely, the installation represented at FIGS. 6A-6B is generally defined by the valve V and tire pressure monitor TPM being inadequately installed upon the wheel W.

The measurement M represented at FIG. 5C is associated with the adequate installation of the valve V and the tire pressure monitor TPM upon the wheel W at FIGS. 5A-5B. The measurement M' represented at FIG. 6C is associated with the inadequate installation of the valve V and the tire pressure monitor TPM upon the wheel W at FIGS. 6A-6B.

With reference to FIG. 4, after the robotic device R positions the stemming device 10 relative the wheel W such that the installation axis $A_{10}$-$A_{10}$ (and, correspondingly, the axis $A_V$-$A_V$ extending through the axial center of the valve stem $V_S$) of the stemming device 10 is aligned with the axial center of the valve hole $W_V$ of the wheel W, the computing device 50 may cause the robotic device R to move the stemming device 10, and, correspondingly, the valve V and tire pressure monitor TPM toward the wheel W. As seen, respectively, in FIGS. 5A and 6A, the robotic device R may urge the stemming device 10 with sufficient force for causing the rubber valve body $V_B$ covering the stem $V_S$ through the valve hole $W_V$ of the wheel W. Adequate installation of the valve V and tire pressure monitor TPM relative the wheel W may be defined by, for example, registering the neck portion $V_N$ of the valve V within the valve hole $W_V$ of the wheel W (as seen in, for example, FIG. 5B). If, as seen in FIG. 6B, the neck portion $V_N$ of the valve V is not registered within the valve hole $W_V$ of the wheel W, the valve V and tire pressure monitor TPM may be said to be inadequately installed relative to the wheel W. An inadequate installation may be alternatively referred to as "an insertion fault" resulting from, for example, the rubber valve body $V_B$ of the valve V not including lubricant, misalignment or wear-out conditions associated with the stemming device 10, which may undesirably cause the rubber valve body $V_B$ of the valve V to not fully and cleanly pass through the valve hole $W_V$ of the wheel W as seen in FIG. 6B.

The adequate installation as seen in FIG. 5B may be graphically represented according to the measurement M seen at FIG. 5C. The inadequate installation as seen in FIG. 6B may be graphically represented according to the measurement M' seen at FIG. 6C. The data of the measurements M, M' may be generated by the force transducer 16 of the valve-engaging portion 14 of the stemming device 10. As seen in FIGS. 4, 5A-5B and 6A-6B, the force transducer 16 may be communicatively-coupled (e.g., wirelessly or hard-wired) to the computing device 50. In some instances, the data of the measurements M, M' may be graphically displayed on a screen or monitor of the computing device 50.

In an example, the force transducer 16 generates the measurements M, M' as a result of an applied axial force along the installation axis $A_{10}$-$A_{10}$ of the stemming device 10 throughout the act of inserting the rubber valve body $V_B$ of the valve V through the valve hole $W_V$ of the wheel W. Furthermore, the computing device 50 may record the force signal associated with the measurements M, M' throughout the act of inserting the rubber valve body $V_B$ of the valve V through the valve hole $W_V$ of the wheel W. Yet even further, the computing device 50 may include an algorithm that analyzes the data signature associated with the recorded force signal associated with the measurements M, M' to determine if the valve V and tire pressure monitor TPM was adequately or inadequately installed relative the wheel W. In some instances, the force signal associated with the measurements M, M' is collected digitally by the computing device 50 at a rate of 100 Hz or greater.

As described above, the computing device 50 may be communicatively-coupled (e.g., wirelessly or hardwired by, for example, one or more communication conduits) to, for example, a characteristic signature database including one or more force rate signals indicative of an adequate installation of one or more types of valves V and tire pressure monitors TPM to one or more types of wheels W. In some instance, the characteristic signature database including one or more force rate signals may be alternatively called "virtual force rate signal" that are created by numerically estimating a time derivative of the force imparted by the stemming device 10 over time. In an example, a force rate signature stored in the characteristic database may be substantially similar to the data associated with the force signal measurement seen at FIG. 5C. Therefore, upon the computing device 50 receiving the measurement M, and, after comparing the measurement M to the force rate signature and determining that the measurement M is substantially similar to the force rate signature, the computing device 50 may electronically determine that the valve V and tire pressure monitor TPM has been adequately installed upon the wheel W. Conversely, upon the computing device 50 receiving the measurement M', and, after comparing the measurement M' to the force rate signature and determining that that measurement M' is not substantially similar to the force rate signature, the computing device 50 may electronically determine that the valve V and tire pressure monitor TPM has been inadequately installed upon the wheel W. Depending on the adequate or inadequate installation determination, the computing device 50 may operate the conveyor 202 in a manner for segregating (i.e., rejecting) inadequately installed valves V and tire pressure monitors TPM from adequately installed valves V and tire pressure monitors TPM.

FIG. 5C depicts a graph of what a successful installation might look like. In FIG. 5C, the first derivative of the force signal is plotted against sample count. In a successful marrying of the valve stem $V_S$ to the valve stem opening $W_V$ in the wheel W, certain characteristics should be present. For example, once the insertion process begins in earnest, the initial signal should show a steep negative slope culminating at a negative peak 5C' immediately followed by a steep positive slope culminating at a positive peak 5C". This characteristic signature is not evident in a faulty installation (see, e.g., FIG. 6C that depicts a faulty installation). In the faulty installation depiction of FIG. 6C, although there is an initial negative slope culminating at a negative peak (see, e.g., the negative spike 6C'), the magnitude of the initial negative spike 6C' is merely ⅓ of the magnitude of the initial negative spike 5C' depicted in FIG. 5C. An additional confirmation that the installation is faulty is that a spike 6C", which immediately follows initial negative spike 6C', has very little, if any positive amplitude. This is in contrast to the amplitude of the positively-going spike 5C" in the successful installation which has a magnitude of approximately 1½ units above the X-axis (i.e., the X-axis functions as the zero amplitude reference in this graph). Of course, the absolute amplitude of the various peaks mentioned above relating to the first derivative force signal of the successful installation as well as the absolute amplitude of the first derivative force signal of a faulty installation are not nearly as important as the relative peak amplitudes between the successful installation and the faulty installation. Also, the signatures generated from a first derivative of a force signal during installation can be compared to a "gold standard signature database" that is created using one or more signatures generated from installations that are known to be acceptable. Any number of statistical techniques can be used to generate a database of "gold standard" signatures, which can then be quickly and easily compared to the signatures generated during production use of the valve stemming device 10. Although it may be most cost efficient to use a force sensor as the primary means of measuring the parameters generated during the installation and thereafter mathematically manipulating the force signal to generate the first derivative of the force signal (as shown in FIGS. 5C and 6C), there is nothing prohibiting the use of a sensor that measures (directly) the first derivative of the install force. This technique might be beneficial in installations where time efficiency is critical inasmuch as the use of a force derivative sensor would not have the inherent time delay associated with collecting a force signal, storing it, and mathematically converting it into data that is a representative of its first derivative.

Figure 5D:
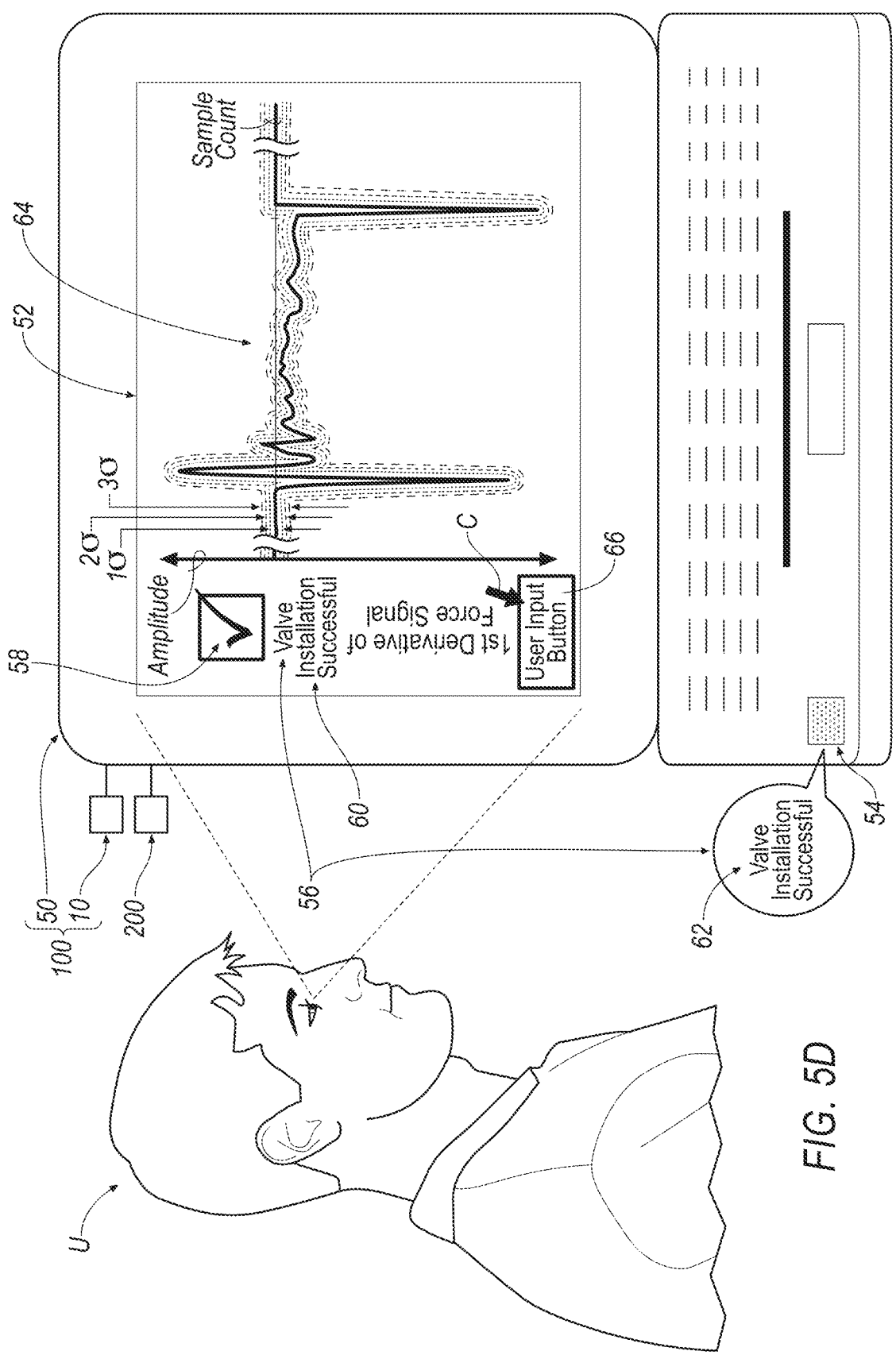
FIG. 5D is an exemplary view of a computing device displaying the force signal of FIG. 5C and an indicator or alert regarding the adequate performance of the stemming device that has adequately-secured the valve including the tire pressure monitor to the wheel.
Figure 6D:
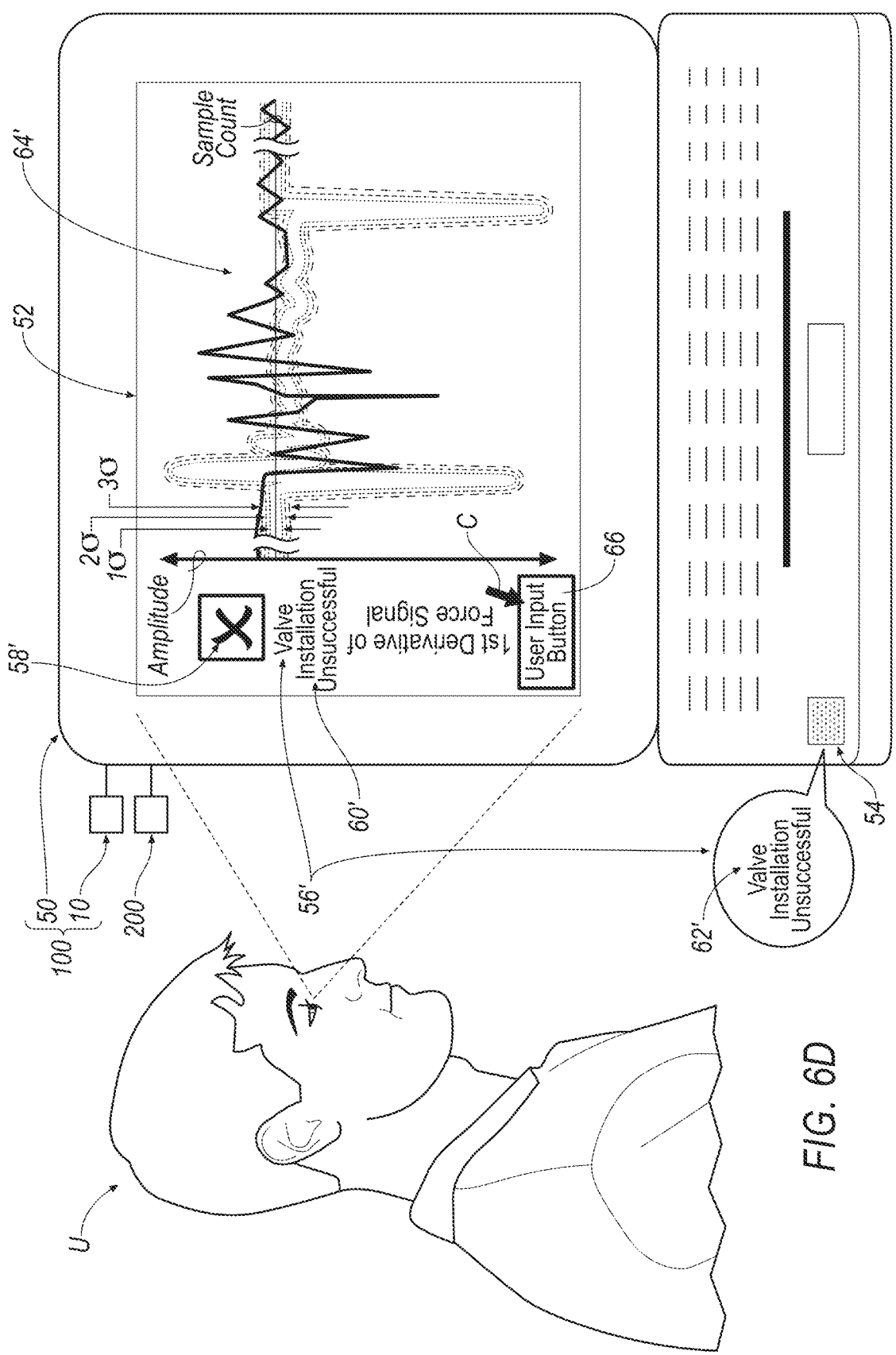
FIG. 6D is an exemplary view of a computing device displaying the force signal of FIG. 6C and an indicator or alert regarding the inadequate performance of the stemming device that has inadequately-secured the valve including the tire pressure monitor to the wheel.

Referring to FIGS. 5D and 6D, an exemplary computing device 50 includes one or more of a display screen 52, a speaker 54 or the like that may be utilized for ascertaining the performance of the stemming device 10. A program is executed by the processor of the computing device 50 that is configured to display on the display screen 52 a graphical user interface (GUI). The performance of the stemming device 10 includes a determination that the valve V including the tire pressure monitor TPM has been adequately secured to the wheel W (as seen at FIG. 5B) or a determination that the valve V including the tire pressure monitor TPM has not been adequately secured to the wheel W (as seen at FIG. 6B). The adequate or inadequate securing of the valve V including the tire pressure monitor TPM to the wheel W may be determined: (1) automatically, e.g., by the computing device 50; (2) manually by a user U, technician or installation agent; or (3) a combination thereof. The user U, technician or installation agent may view or selectively interact with the GUI displayed on the display screen 52 in view of the ascertained performance of the stemming device 10.

In an example, the performance of the stemming device 10 may be based upon a force signal pattern recognition routine that may be defined by instructions stored in memory that are executed by a processor. In an example, the memory and the processor may be components of the computing device 50. However, in other instances, one or both of the memory and the processor may be associated with a different or remote computing device (not shown) that is connected wirelessly or in a hard-wired fashion to the computing device 50.

In an example, the force signal pattern recognition routine may be based upon a statistical technique whereby a database (that may be, e.g., stored in the memory of the computing device 50) of a plurality of "gold standard" force signal signatures is utilized for the purpose of permitting the user U, technician or installation agent to quickly and easily determine the performance of the stemming device 10. As seen at FIGS. 5D and 6D, the exemplary statistical technique employed by the computing device 50 is three standard deviations (see, e.g., 1σ, 2σ, 3σ) of the mean of a plurality of force signals stored in the database that were previously generated by the stemming device 10 when the valve V including the tire pressure monitor TPM has been adequately secured to the wheel W. As seen at both of FIGS. 5D and 6D, each of the first standard deviation 1σ, the second standard deviation 2σ and the third standard deviation 3σ are substantially similar to a "gold standard" force signal signature that may include, for example, the steep negative slope culminating at a negative peak 5C' immediately followed by the steep positive slope culminating at the positive peak 5C" as seen at FIG. 5C.

At FIGS. 5D and 6D in a first example, the computing device 50 may be utilized to automatically determine the performance of the stemming device 10. In some instances, as a result of the processor executing the instructions stored in the memory, the computing device 50 may automatically provide a stemming adequacy indicator or alert 56/56' regarding the performance of the stemming device 10. The stemming adequacy indication or alert 56/56' provided by the computing device 50 may be visual (e.g., the stemming adequacy indictor or alert 56/56' is displayed on the display screen 52), audible (e.g., the stemming adequacy indictor or alert 56/56' is provided by the speaker 54) or a combination thereof.

A methodology for automatically determining performance of the stemming device 10 may include the following steps or instructions executed by the processor. Firstly, the stemming device 10 may communicate or send to the processor the detected force signal associated with the valve V including the tire pressure monitor TPM being secured to the wheel W. The processor compares the force signal against a plurality of "gold standard" force signal signatures stored in the database. In an example, the comparison may include computationally or graphically comparing the force signal against three standard deviations (see, e.g., 1σ, 2σ, 3σ) of the mean of the plurality of force signals stored in the database that were previously generated by the stemming device 10 when the valve V including the tire pressure monitor TPM has been adequately secured to the wheel W. The comparing step may further include determining if the force signal pattern substantially fits within or is classified into one of the first standard deviation 1σ, the second standard deviation 2σ or the third standard deviation 3σ of the three standard deviations 1σ, 2σ, 3σ of the mean of a plurality of force signals stored in the database.

In an example, in order to arrive at an "adequately stemmed" determination, the force signal pattern may have to substantially fit within or be classified into the first standard deviation 1σ but not the second standard deviation 2σ or the third standard deviation 3σ of the three standard deviations 1σ, 2σ, 3σ of the mean of a plurality of force signals stored in the database. In another example, in order to arrive at an "adequately stemmed" determination, the force signal pattern may have to substantially fit within or be classified into the first standard deviation 1σ and the second standard deviation 2σ but not the third standard deviation 3σ of the three standard deviations 1σ, 2σ, 3σ of the mean of a plurality of force signals stored in the database. In yet another example, in order to arrive at an "adequately stemmed" determination, the force signal pattern may not extend beyond (i.e., does not substantially fit within or be classified into) the third standard deviation 3σ of the three standard deviations 1σ, 2σ, 3σ of the mean of a plurality of force signals stored in the database.

As seen at FIG. 5D, if the result of the comparing step is a determination that the force signal pattern substantially fits within or is classified into one or more of the first standard deviation 1σ, the second standard deviation 2σ or the third standard deviation 3σ of the three standard deviations 1σ, 2σ, 3σ of the mean of a plurality of force signals stored in the database, the GUI displayed on the display screen 52 automatically displays a positive stemming adequacy indicator 56 such as, for example, a symbol 58 such as a check mark. Additionally or alternatively, the positive stemming adequacy indicator 56 displayed on the GUI of the display screen 52 may include text 60 (e.g., "Valve Installation Successful"). If the positive stemming adequacy indicator 56 also (or, alternatively) includes audio 62, the audio 62 may include an automatic actuation of the speaker 54 providing a pleasant sound such as a chime and/or a synthesized voice announcing, for example, what is displayed by the text 60 associated with the positive stemming adequacy indicator 56 (e.g., the synthesized voice may announce: "valve installation successful" audio 62). In yet another example, after automatically determining the adequate performance of the stemming device 10, the processor may send a signal to a motor driving the conveyor 202 in order to advance the adequately stemmed wheel W further downstream the conveyor 202 in a direction according to arrow D1 for further processing (e.g., soaping/lubricating the wheel W prior to joining an uninflated tire T to the wheel W for forming an uninflated tire-wheel assembly TW).

Therefore, in an example, without any manual intervention (i.e., "automatically"), the user U, technician or installation agent may be able to see on the GUI displayed by the display screen 52 and/or hear from the speaker 54 the positive stemming adequacy indicator 56 in order to quickly and easily determine the adequate performance of the stemming device 10 while, optionally, the stemming device 10 will communicate with the conveyor 202 for automatically sorting (e.g., according to the direction of the arrow D1) an adequately stemmed wheel W (see, e.g., FIG. 5B) from an inadequately stemmed wheel W (see, e.g., FIG. 6B). Furthermore, in some instances, the positive stemming adequacy indicator 56 may further include a graphical representation 64 of the force signal that is graphed with the applied statistical technique (e.g., the three standard deviations 1σ, 2σ, 3σ) displayed on the GUI of the display screen 52 in order to unambiguously indicate to the user U, technician or installation agent the basis of the adequate result provided by the processor being one or more of the symbol 58, the text 60 and the audio 62. The graphical representation 64 may be provided alone or in combination with one or more of the symbol 58, the text 60 and the audio 62.

As seen at FIG. 6D, if the result of the comparing step is a determination that the force signal pattern does not fit within or is classified into one of the first standard deviation 1σ, the second standard deviation 2σ or the third standard deviation 3σ of the three standard deviations 1σ, 2σ, 3σ of the mean of a plurality of force signals stored in the database, the GUI displayed on the display screen 52 automatically displays a negative stemming adequacy indicator 56' such as, for example, a symbol 58' such as the letter X. Additionally or alternatively, the negative stemming adequacy indicator 56' displayed on the GUI of the display screen 52 may include text 60' (e.g., "Valve Installation Unsuccessful"). If the negative stemming adequacy indicator 56' also (or, alternatively) includes audio 62', the audio 62' may include an automatic actuation of the speaker 54 providing an unpleasant sound such as a buzz and/or a synthesized voice announcing, for example, what is displayed by the text 60' associated with the negative stemming adequacy indicator 56' (e.g., the synthesized voice may announce: "valve installation unsuccessful" audio 62'). In yet another example, after automatically determining the inadequate performance of the stemming device 10, the processor may send a signal to a conveyor controller 218

(see, e.g., FIG. 2) communicatively-coupled to a conveyor switch 220 (see, e.g., FIG. 2) in order to advance the inadequately stemmed wheel W from the first direction D1 along the conveyor 202 toward the downstream end $202_D$ of the conveyor 202 to a second direction D2 along a rejection conveyor 202' (see, e.g., FIG. 2) to a reject station 222 for inspection and/or subsequent re-stemming due to the fact that the inadequately stemmed wheel W is not suitable for further movement toward the downstream end $202_D$ of the conveyor 202 for further processing (e.g., soaping/lubricating the wheel W prior to joining an uninflated tire T to the wheel W for forming an uninflated tire-wheel assembly TW).

Therefore, in an example, without any manual intervention (i.e., "automatically"), the user U, technician or installation agent may be able to see on the GUI displayed by the display screen 52 and/or hear from the speaker 54 the negative stemming adequacy indicator 56' in order to quickly and easily determine the inadequate performance of the stemming device 10 while, optionally, the computing device 50 will communicate with the conveyor controller 218 that operates one or more of the conveyor 202, the conveyor switch 220 and the rejection conveyor 202' for automatically guiding the inadequately stemmed wheel W from the first direction D1 along the conveyor 202 to the second direction D2 along the rejection conveyor 202' in order to segregate (i.e., reject) the inadequately stemmed wheel W (see, e.g., FIG. 6B) from one or more adequately stemmed wheels W (see, e.g., FIG. 5B). Furthermore, in some instances, the negative stemming adequacy indicator 56' may further include a graphical representation 64' of the force signal that is graphed with the applied statistical technique (e.g., the three standard deviations $1\sigma$, $2\sigma$, $3\sigma$) displayed on the GUI of the display screen 52 in order to unambiguously indicate to the user U, technician or installation agent the basis of the inadequate result provided by the processor being one or more of the symbol 58', the text 60' and the audio 62'. The graphical representation 64' may be provided alone or in combination with one or more of the symbol 58', the text 60' and the audio 62'.

In another implementation, the user U, technician or installation agent may interpret one or more stemming adequacy indicators 56/56' represented on the GUI that is displayed by the display screen 52 and/or announced by the speaker 54 of the computing device 50 in order to manually determine the performance of the stemming device 10. Furthermore, as will be described in the following disclosure, in view of how user U, technician or installation agent manually determines the performance of the stemming device 10 in view of the one or more stemming adequacy indicators 56/56' represented on the GUI that is displayed by the display screen 52, the user U, technician or installation agent may elect to manually intervene, manually interrupt or manually take control over the operation of the conveyor 202 (e.g., by providing an input to the conveyor controller 218 by way of, for example, physically depressing a button 224 communicatively-coupled to the conveyor controller 218 or by manipulating a computer mouse (not shown) by hovering cursor C over a graphically-displayed user input button 66 of the GUI that is displayed on the display screen 52 and clicking a button 224 of the computer mouse for graphically selecting or graphically-pressing the graphically-displayed user input button) in order manually segregate one or more inadequately stemmed wheels W from one or more adequately stemmed wheels W. Accordingly, in an example, the conveyor 202 may be permitted to advance one or a plurality of adequately and/or inadequately stemmed wheels W in the direction of arrow D1 along the conveyor 202 until the user U, technician or installation agent elects to, for example, physically depress the button 224 or click on the a graphically-displayed user input button 66 of the GUI that is displayed on the display screen 52.

With reference to FIGS. 5D and 6D, in an example, the GUI displayed by the display screen 52 may display the graphical representation 64/64' of the force signal graphed with the applied statistical technique (e.g., the three standard deviations $1\sigma$, $2\sigma$, $3\sigma$) as described above in order to unambiguously indicate to the user U, technician or installation agent a visual comparison of the detected force signal in view of a "gold standard" based upon a plurality of force signal signatures. The GUI provided by the display screen 52 may display the graphical representation 64/64' alone or in combination with one or more of the symbol 58/58', the text 60/60' and the audio 62/62'. However, in some instances, the GUI provided by the display screen 52 may not include one or more of the symbol 58/58', the text 60/60' and the audio 62/62' with the graphical representation 64/64' of the force signal graphed with the applied statistical technique, and, as such, the determination of the performance of the stemming device 10 is subject to how the user U, technician or installation agent reads or interprets the graphical representation 64/64' of the force signal graphed with the applied statistical technique.

If, for example, the user U, technician or installation agent's interpretation of the graphical representation 64/64' of the force signal graphed with the applied statistical technique that is provided by the GUI 52 displayed by the display screen 52 represents an indication that the stemming device 10 has inadequately stemmed the wheel W, the user U, technician or installation agent may elect to manually intervene or manually operate the conveyor 202 such that the conveyor 202 is not permitted to further transport the inadequately stemmed wheel W (see, e.g., FIG. 6B) in the first direction D1 along the conveyor 202 in order to prevent subsequent processing of the inadequately stemmed wheel W (e.g., soaping/lubricating the wheel W prior to joining an uninflated tire T to the wheel W for forming an uninflated tire-wheel assembly TW). In such a circumstance, the user U, technician or installation agent may manually depress the button 224 or click on/select the a graphically-displayed user input button 66 of the GUI that is displayed on the display screen 52 in order to manually intervene or manually assert control over the operation of the conveyor 202.

In an example, by depressing the button 224 or by clicking on/selecting the a graphically-displayed user input button 66 of the GUI that is displayed on the display screen 52, a user-initiated command or signal is provided to the conveyor controller 218 that will result in ceasing further transportation of the inadequately stemmed wheel W (see, e.g., FIG. 6B) in the first direction D1 upon the conveyor 202. In another example, by depressing the button 224 or by clicking on/selecting the a graphically-displayed user input button 66 of the GUI that is displayed on the display screen 52, a user-initiated command or signal is provided to the conveyor controller 218 that will result in sending an actuation signal to the conveyor switch 220 in order to advance the inadequately stemmed wheel W from the first direction D1 along the conveyor 202 toward the downstream end $202_D$ of the conveyor 202 to the second direction D2 along the rejection conveyor 202' to the reject station 222 for inspection and/or subsequent re-stemming due to the fact that the inadequately stemmed wheel W is not suitable for further movement toward the downstream end $202_D$ of the conveyor 202 for further processing (e.g., soaping/lubricating the wheel W prior to joining an uninflated tire T to the wheel W for forming an uninflated tire-wheel assembly TW).

Figure 7:
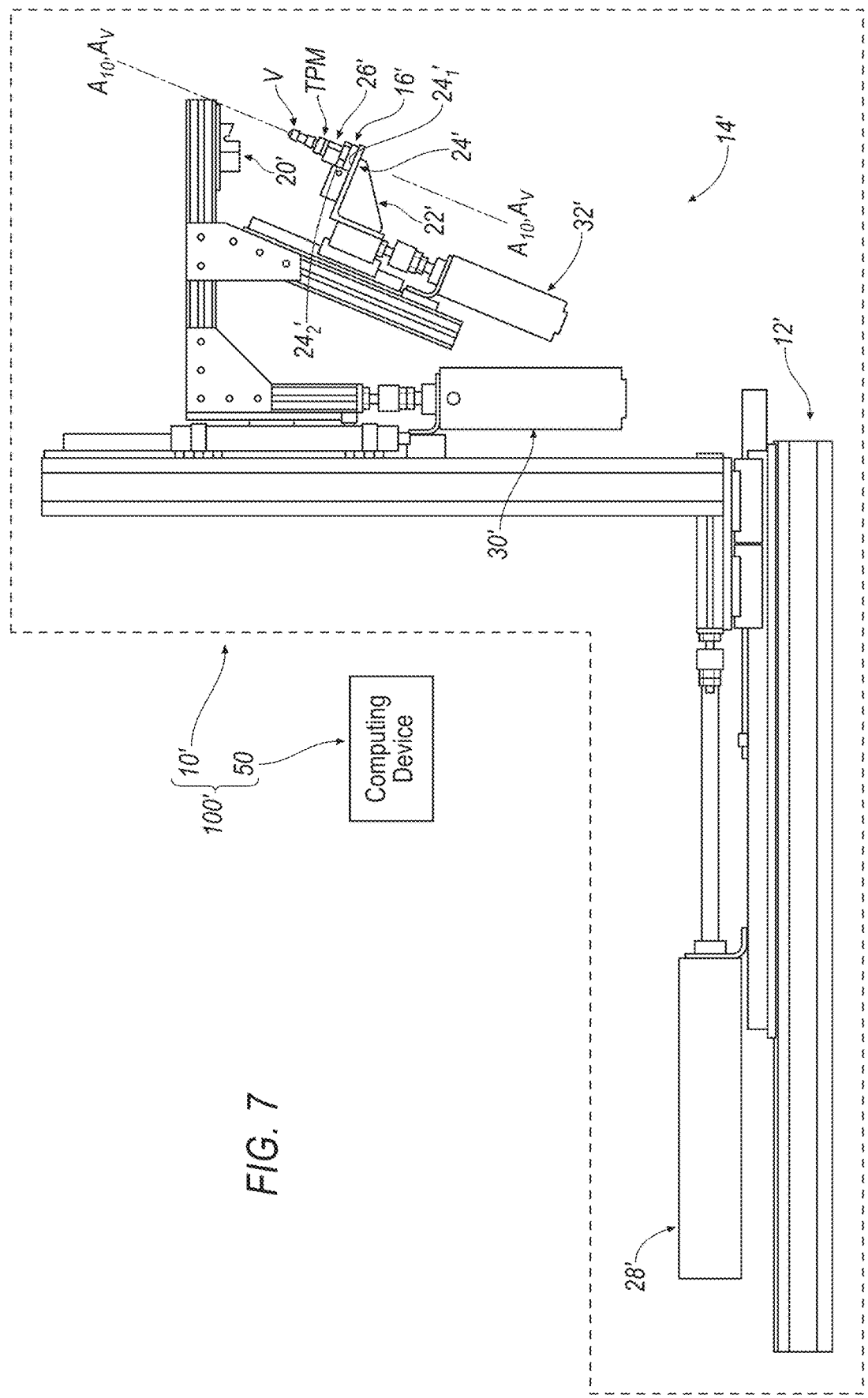
FIG. 7 is a side view of a valve including a tire pressure monitor removably-secured to an exemplary stemming device that is communicatively-coupled to a computing device.

Referring to FIG. 7, an exemplary stemming device is shown generally at 10'. The stemming device 10' is communicatively-coupled to a computing device 50 and may define a stemming system 100' that is configured for joining the valve V to the wheel W (see, e.g., FIGS. 8A-8F) by: (as similarly described above and as similarly seen in FIG. 4) axially-aligning the rubber valve body $V_B$ of the valve V with a valve hole $W_V$ that is bored through the wheel W; then, (as similarly described above and as similarly seen in FIG. 5A), inserting the rubber valve body $V_B$ of the valve V into the valve hole $W_V$ and urging the rubber valve body $V_B$ of the valve V through the valve hole $W_V$ and (as similarly described above and as similarly seen in FIGS. 5A-5B), registering the neck portion $V_N$ of the valve V within the valve hole $W_V$ of the wheel W such that the valve V is adequately-secured to the wheel W. After the valve V is adequately-secured to the wheel W, the valve V seals the valve hole $W_V$ from surrounding atmosphere A for maintaining pressure within the circumferential air cavity $T_{AC}$ of the tire T for keeping the tire-wheel assembly TW in an inflated state. Furthermore, a tire pressure monitor TPM may be secured to the ring-shaped head portion $V_H$ of the valve V such that upon inflation of the tire-wheel assembly TW, the tire pressure monitor TPM, which is arranged within the circumferential air cavity $T_{AC}$ of the tire T, may wirelessly communicate a sensed pressure of the circumferential air cavity $T_{AC}$ to, for example, a receiver of a vehicle computer (not shown).

The stemming system 100' operates in a substantially similar manner as described above at FIGS. 5C-5D and 6C-6D with respect to the "adequate" or "inadequate" installation of the valve V with the wheel W. Therefore, an accompanying discussion of an "adequate" or "inadequate" installation of the valve V with wheel W as applied to the stemming system 100' is not discussed here.

Unlike the stemming device 10 of FIG. 1, the stemming device 10' does not include a carrier portion (see, e.g., carrier portion 18) that is connected to or defines an end effector or a distal end of a robotic device R (see e.g., FIG. 2) having a robotic arm RA for performing steps associated with an automatic installation of the valve V on the wheel W. As seen at FIG. 7, the stemming device 10' includes a base portion 12' and a valve-engaging portion 14'. As will be described in the following disclosure, the valve-engaging portion 14' includes a force transducer 16' (e.g., a load cell) that obtains a measurement M/M' (e.g., an applied axial force over time throughout a process of joining the valve V to the wheel W as seen in FIGS. 5C and 6C) imparted by the valve-engaging portion 14' to the wheel W by way of the valve V and the tire pressure monitor TPM. The measurement M/M' is recorded by the computing device 50. Furthermore, the computing device 50 may include an algorithm that analyzes a data signature associated with the measurement M/M' to determine if the valve V was adequately or inadequately installed by the stemming device 10'.

Although the stemming device 10' is described above to include a force transducer 16' that obtains a measurement M/M' imparted by the valve-engaging portion 14' to the wheel W by way of the valve V and the tire pressure monitor TPM, the stemming device 10' may include other or additional data-obtaining components. In an example, the stemming device 10' may also include a displacement (travel) transducer that provides additional information for greater defect discrimination possibilities.

The stemming device 10' may further optionally include a wheel-engaging portion 20' connected to the base portion 12'. In an example, the wheel-engaging portion 20' may define a wheel clamping portion for securing the stemming device 10' to the wheel W prior to joining the valve V to the wheel W. The wheel-engaging portion 20' may include structure that permits movement (e.g., sliding movement) of the wheel-engaging portion 20' relative the base portion 12'.

In addition to the force transducer 16', the valve-engaging portion 14' also includes an arm portion 22', a support portion 24' and a securing portion 26'. The arm portion 22' may be connected to the base portion 12'. The support portion 24' may be connected to the arm portion 22'.

The support portion 24' is generally defined by a first surface 241' and a second surface 242'. The first surface 241' directly supports the force transducer 16' and is substantially orthogonal to an installation axis $A_{10}$-$A_{10}$ of the stemming device 10'. Furthermore, the installation axis $A_{10}$-$A_{10}$ of the stemming device 10' is axially aligned with the axis $A_V$-$A_V$ extending through the axial center of the valve stem $V_S$. Yet even further, the force transducer 16' may be said to be uniaxial or co-linear with the axis $A_V$-$A_V$ extending through the axial center of the valve stem $V_S$.

The second surface 242' is substantially perpendicular to the first surface 241' and is configured to support or is arranged at least proximate a side surface of one or more of the force transducer 16', the securing portion 26' and the tire pressure monitor TPM connected to the valve V. Furthermore, as seen in FIG. 7, the second surface 242' is substantially parallel to the installation axis $A_{10}$-$A_{10}$ of the stemming device 10'.

The securing portion 26' may be disposed upon an upper surface of the force transducer 16' and is arranged opposite the first surface 241' of the support portion 24'. The securing portion 26' may include attachment structure (not shown) for removably securing the tire pressure monitor TPM and the valve V to the valve-engaging portion of the stemming device 10'.

In addition to the force transducer 16', the valve-engaging portion 14' also includes a plurality of linear servos 28'-32'. The plurality of linear servos 28'-32' includes: a first linear servo 28', a second linear servo 30' and a third linear servo 32'. As will be described in the following disclosure at FIGS. 8A-8F, the plurality of linear servos 28'-32' provide an alternative to a robotic arm RA (see, e.g., FIG. 3) for performing steps associated with an automatic installation of the valve V on the wheel W.

Referring to FIGS. 8A-8F, the base portion 12' of the stemming device 10' is disposed upon, for example, a support surface 226' that defines part of a conveyor, or, alternatively, is separate from and arranged proximate a conveyor. The conveyor may be substantially similar to the conveyor 202 of FIGS. 2-3. Accordingly, the conveyor 202 is configured for moving a plurality of wheels W past the stemming device 10'.

Figure 8A:
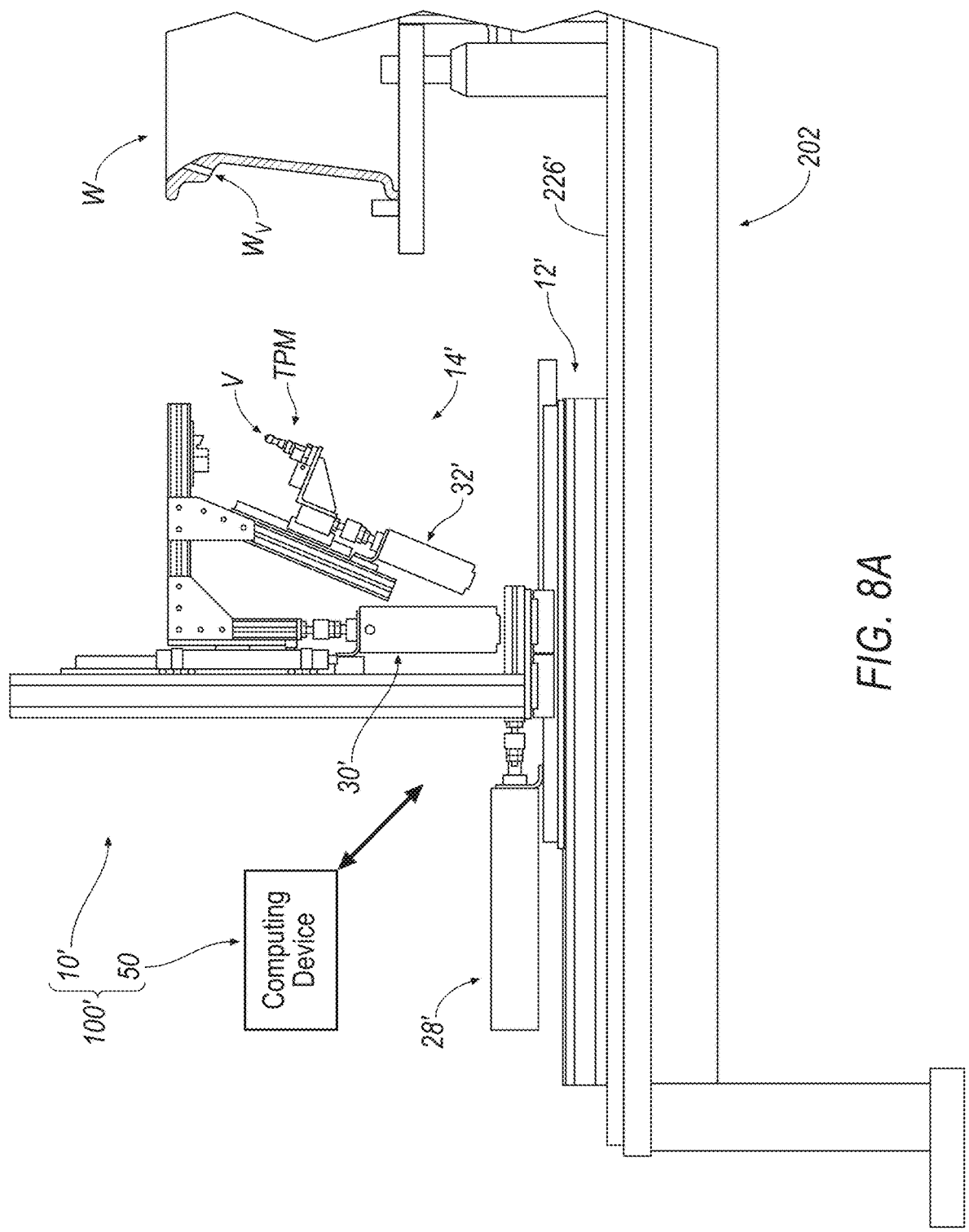
FIGS. 8A-8E are end views of an exemplary wheel processing system including the stemming device of FIG. 7.
Figure 8B:
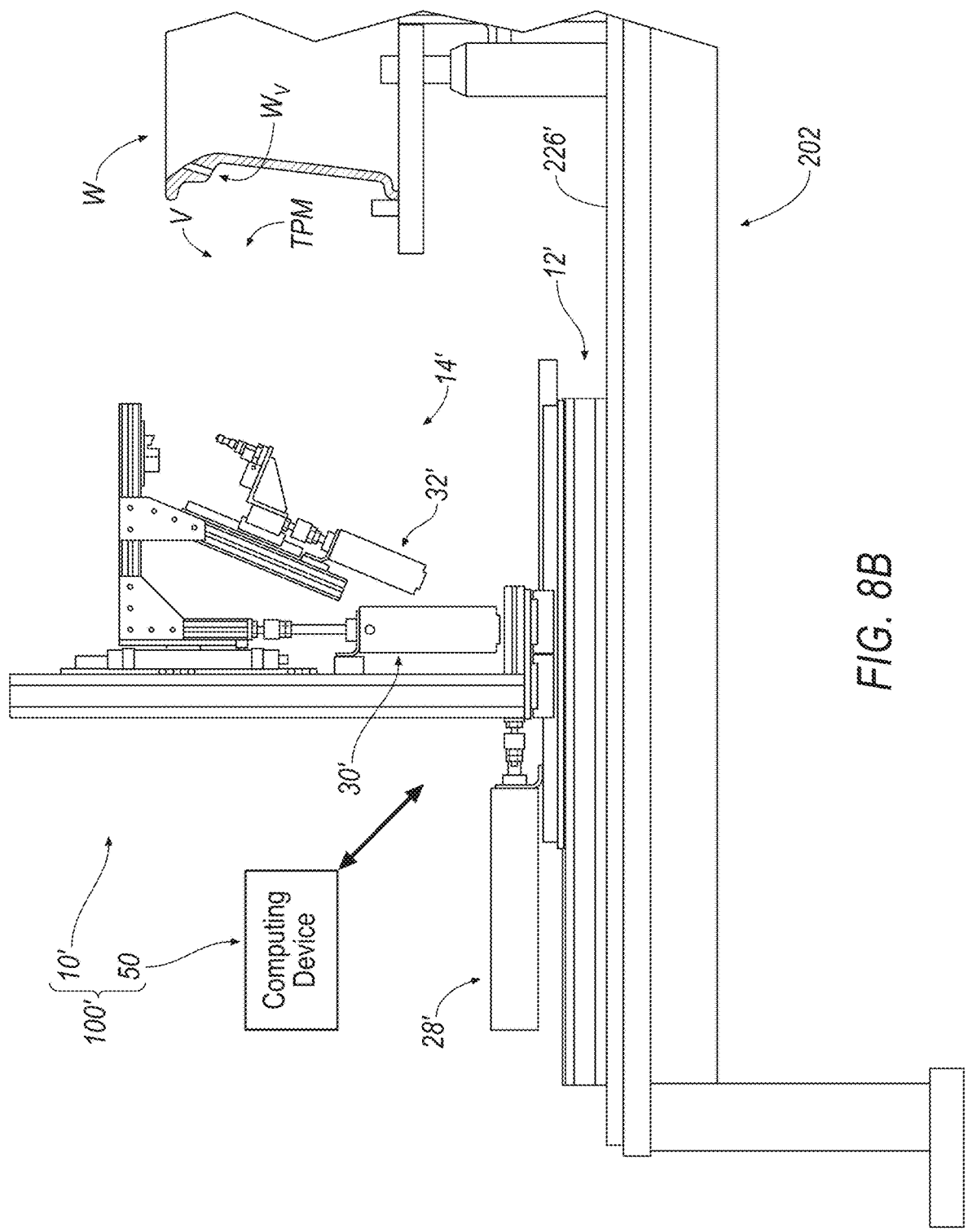

As seen at FIG. 8A, the stemming device 10' may be initially arranged in a retracted or stowed orientation with a valve V secured to the valve-engaging portion 14'. Referring to FIGS. 8A-8B, once the conveyor 202 arranges a wheel W proximate or in alignment with the stemming device 10', the computing device 50 may actuate, for example, the second linear servo 30' in order to lift or raise the valve-engaging portion 14' such that the valve V is arranged at a horizontal plane below the valve hole $W_V$ that is bored through the wheel W.

Figure 8C:
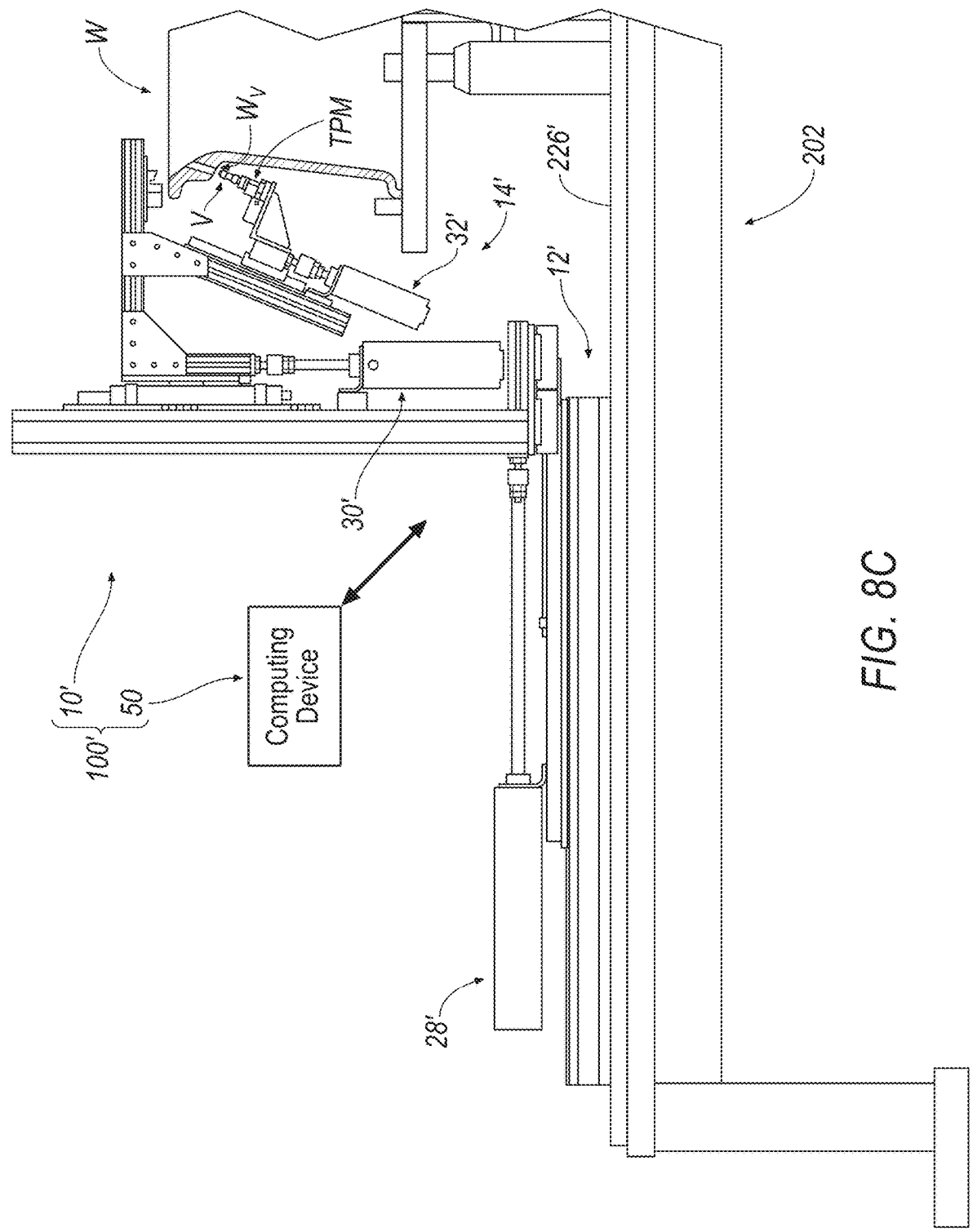
Figure 8D:
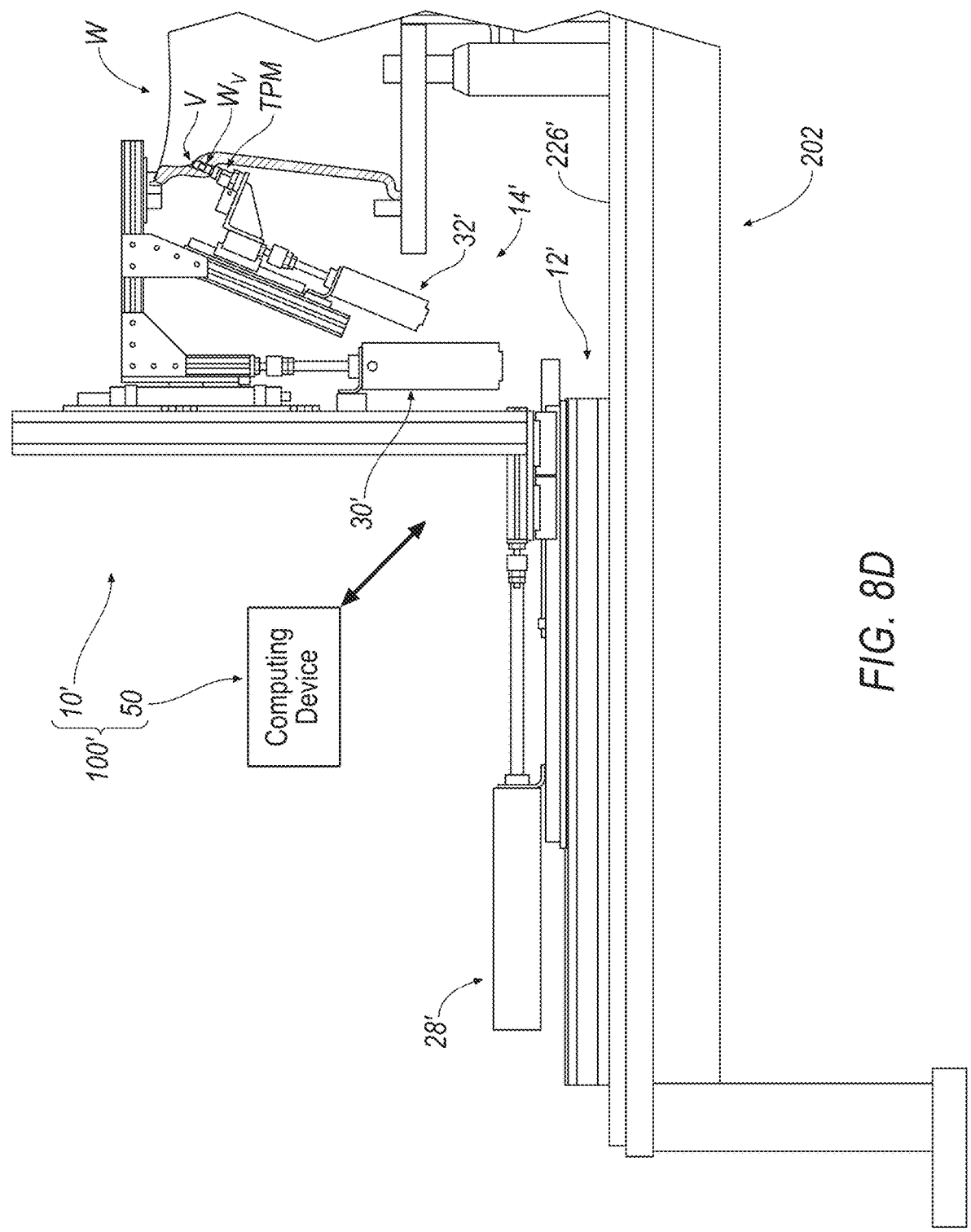
Figure 8E:
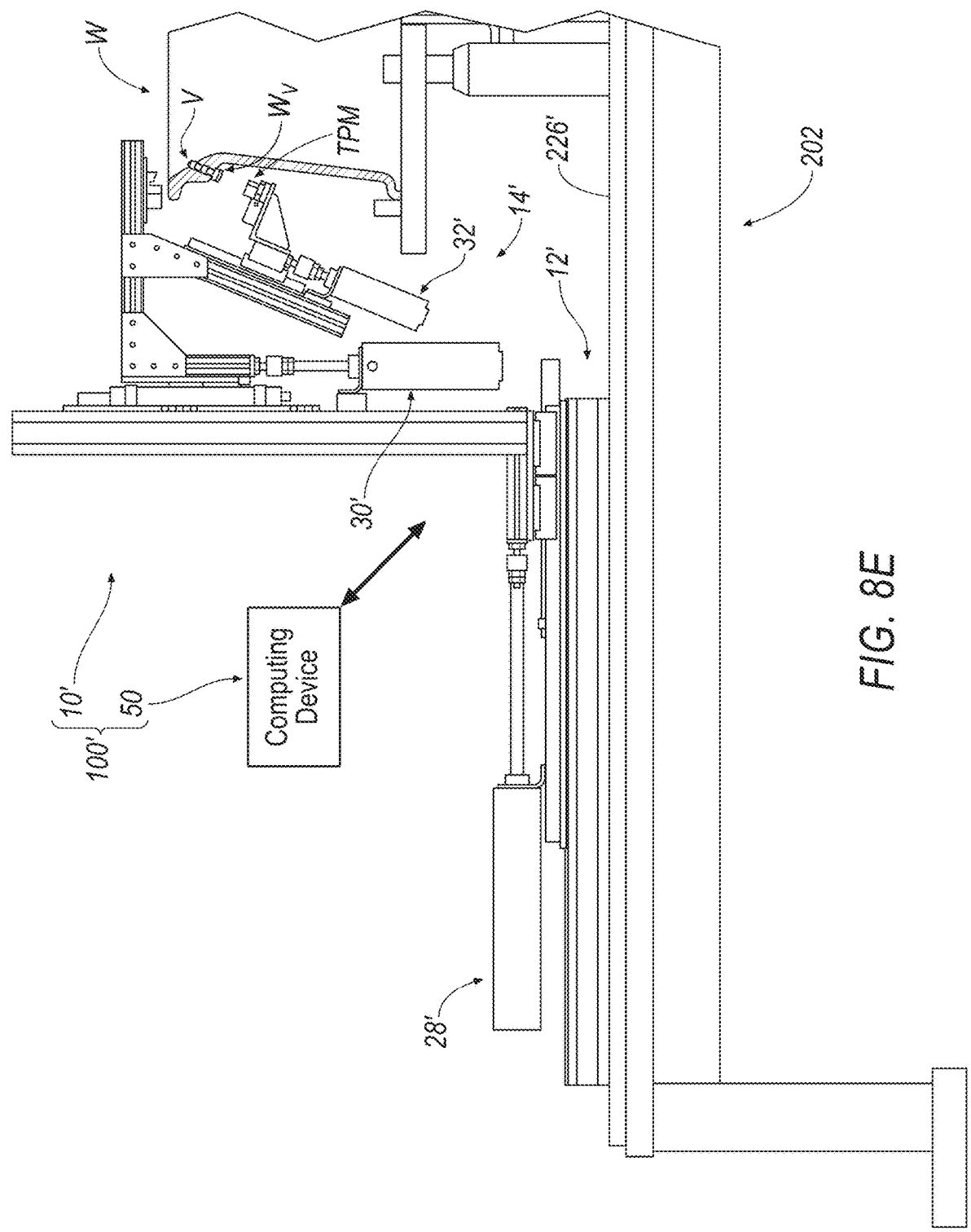

Referring to FIGS. 8B-8C, the computing device 50 may actuate the first linear servo 28 in order to horizontally move the valve-engaging portion 14' such that the rubber valve body $V_B$ of the valve V is axially-aligned with the valve hole $W_V$ that is bored through the wheel W. Then, as seen at FIGS. 8C-8D, in an example, the computing device 50 may actuate the third linear servo 32' in order to insert the rubber valve body $V_B$ of the valve V into the valve hole $W_V$ and urging the rubber valve body $V_B$ of the valve V through the valve hole $W_V$. Accordingly, the intended result arising from the actuation of the third linear servo 32' is that the neck portion $V_N$ of the valve V is registered within the valve hole $W_V$ of the wheel W such that the valve V is adequately-secured to the wheel W. After the valve V is adequately-secured to the wheel W, the valve V seals the valve hole $W_V$ from surrounding atmosphere A for maintaining pressure within the circumferential air cavity $T_{AC}$ of the tire T for keeping the tire-wheel assembly TW in an inflated state. Then, as seen at FIGS. 8D-8E, the computing device 50 may actuate the plurality of linear servos 28'-32' in a reverse order as described above in order to withdrawal the valve-engaging portion 14' away from the valve hole $W_V$ of the wheel W after the valve V has been secured to the wheel W.

FIG. 13 is schematic view of an example computing device 1100 that may be used to implement the systems and methods described in this document. The components 1110, 1120, 1130, 1140, 1150, and 1160 shown at FIG. 13, their connections and relationships, and their functions, are meant to be exemplary only, and are not meant to limit implementations of the inventions described and/or claimed in this document.

The computing device 1100 includes a processor 1110, memory 1120, a storage device 1130, a high-speed interface/controller 1140 connecting to the memory 1120 and high-speed expansion ports 1150, and a low speed interface/controller 1160 connecting to a low speed bus 1170 and a storage device 1130. Each of the components 1110, 1120, 1130, 1140, 1150, and 1160, are interconnected using various busses, and may be mounted on a common motherboard or in other manners as appropriate. The processor 1110 can process instructions for execution within the computing device 1100, including instructions stored in the memory 1120 or on the storage device 1130 to display graphical information for a graphical user interface (GUI) on an external input/output device, such as display screen 1180 coupled to high speed interface 1140. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1120 stores information non-transitorily within the computing device 1100. The memory 1120 may be a computer-readable medium, a volatile memory unit(s), or non-volatile memory unit(s). The non-transitory memory 1120 may be physical devices used to store programs (e.g., sequences of instructions) or data (e.g., program state information) on a temporary or permanent basis for use by the computing device 1100. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1130 is capable of providing mass storage for the computing device 1100. In some implementations, the storage device 1130 is a computer-readable medium. In various different implementations, the storage device 1130 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1120, the storage device 1130, or memory on processor 1110.

The high speed controller 1140 manages bandwidth-intensive operations for the computing device 1100, while the low speed controller 1160 manages lower bandwidth-intensive operations. Such allocation of duties is exemplary only. In some implementations, the high-speed controller 1140 is coupled to the memory 1120, the display screen 1180 (e.g., through a graphics processor or accelerator), and to the high-speed expansion ports 1150, which may accept various expansion cards (not shown). In some implementations, the low-speed controller 1160 is coupled to the storage device 1130 and a low-speed expansion port 1190. The low-speed expansion port 1190, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented in a laptop computer 1100a.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. For example, sensing a force using a force transducer has been used as an example of an embodiment of this invention. However, other types of transducers could be used in the place of a force transducer to detect physical parameters associated with installing the tire-wheel assembly valve (V). Some of these other types of transducers include: a pressure transducer for sensing reactive pressure sensed by the stemming device during the tire-wheel assembly valve (V) install procedure; a relative distance transducer for sensing relative distance between the stemming device and some other device during tire-wheel assembly valve (V) install procedure; an absolute position sensor for sensing absolute distance between the stemming device and some other device tire-wheel assembly valve (V) install procedure; a proximity sensor for sensing the proximity between the stemming device and some other device during the tire-wheel assembly valve (V) install procedure. Accordingly, other implementations are within the scope of the following claims.

What is claimed is:

1. A system comprising:
    data processing hardware; and
    memory hardware in communication with the data processing hardware, the memory hardware storing instructions that when executed on the data processing hardware cause the data processing hardware to perform operations including:
    receiving data associated with at least one physical parameter associated with installing a tire-wheel assembly valve including a transducer that is operatively coupled to the tire-wheel assembly valve;
    recording the received data while inserting, with a stemming device, the tire-wheel assembly valve through a valve hole of a wheel;
    analyzing the recorded data; and
    determining whether the tire-wheel assembly valve is adequately installed within the valve hole of the wheel based on the analyzed recorded data.

2. The system of claim 1, wherein the operations further comprise:
    sending a validation signal to a wheel processing system for validating whether the tire-wheel assembly valve is adequately installed within the valve hole of the wheel.

3. The system of claim 1, wherein the operations further comprise:
    sending a rejection signal to a wheel processing system for rejecting the tire-wheel assembly valve for being inadequately installed within the valve hole of the wheel.

4. The system of claim 1, wherein analyzing the recorded data includes numerically estimating a time derivative of the at least one physical parameter acting along an installation axis of the stemming device over time.

5. The system of claim 1, wherein the at least one physical parameter includes at least one of:
    force;
    pressure;
    absolute distance;
    relative distance; or
    proximity.

6. The system of claim 1, wherein determining whether the tire-wheel assembly valve is adequately installed within the valve hole of the wheel based on the analyzed recorded data includes determining whether the recorded data is similar to a predetermined value.

7. The system of claim 6, wherein the predetermined value is determined from data corresponding to a plurality of adequately installed tire-wheel assembly valves.

8. The system of claim 1, further comprising comparing the recorded data to data corresponding to a plurality of adequately installed tire-wheel assembly valves, wherein the data corresponding to the plurality of adequately installed tire-wheel assembly valves is stored in the memory hardware.

9. A method comprising:
receiving data associated with at least one physical parameter associated with installing a tire-wheel assembly valve including a transducer that is operatively coupled to the tire-wheel assembly valve;
recording the received data while inserting, with a stemming device, the tire-wheel assembly valve through a valve hole of a wheel;
analyzing the recorded data; and
determining whether the tire-wheel assembly valve is adequately installed within the valve hole of the wheel based on the analyzed recorded data.

10. The method of claim 9, further comprising:
sending a validation signal to a wheel processing system for validating whether the tire-wheel assembly valve is adequately installed within the valve hole of the wheel.

11. The method of claim 9, further comprising:
sending a rejection signal to a wheel processing system for rejecting the tire-wheel assembly valve for being inadequately installed within the valve hole of the wheel.

12. The method of claim 9, wherein analyzing the recorded data includes numerically estimating a time derivative of the at least one physical parameter acting along an installation axis of the stemming device over time.

13. The method of claim 9, wherein the at least one physical parameter includes at least one of:
force;
pressure;
absolute distance;
relative distance; or
proximity.

14. The method of claim 9, wherein determining whether the tire-wheel assembly valve is adequately installed within the valve hole of the wheel based on the analyzed recorded data includes determining whether the recorded data is similar to a predetermined value.

15. The method of claim 14, wherein the predetermined value is determined from data corresponding to a plurality of adequately installed tire-wheel assembly valves.

16. The method of claim 9, further comprising comparing the recorded data to data corresponding to a plurality of adequately installed tire-wheel assembly valves, wherein the data corresponding to the plurality of adequately installed tire-wheel assembly valves is stored in memory hardware.

17. A stemming system comprising:
a computing device including data processing hardware and memory hardware in communication with the data processing hardware, wherein the data processing hardware includes a transmitter and a receiver; and
a stemming device communicatively-coupled to the computing device, wherein the stemming device includes a base portion and a valve-engaging portion, wherein the valve-engaging portion includes a transducer configured to obtain a measurement communicated to the receiver of the computing device, wherein the measurement is associated with at least one physical parameter related to installation of a tire-wheel assembly valve to a wheel,
wherein the data processing hardware is configured to analyze the measurement to determine whether the tire-wheel assembly valve is adequately installed by the stemming device.

18. The stemming system of claim 17, wherein the data processing hardware is configured to determine whether the whether the measurement is similar to a predetermined value.

19. The stemming system of claim 18, wherein the data processing hardware is configured to determine the predetermined value from data corresponding to a plurality of adequately installed tire-wheel assembly valves.

20. The stemming system of claim 17, wherein the data processing hardware is configured to compare the measurement to data corresponding to a plurality of adequately installed tire-wheel assembly valves, wherein the data corresponding to the plurality of adequately installed tire-wheel assembly valves is stored in the memory hardware.

* * * * *